US012055879B2

(12) United States Patent
(10) Patent No.: US 12,055,879 B2
(45) Date of Patent: Aug. 6, 2024

Yasukawa et al.

(54) FIXING UNIT AND IMAGE FORMING APPARATUS

(71) Applicant: Canon Kabushiki Kaisha, Tokyo (JP)

(72) Inventors: Kouji Yasukawa, Tokyo (JP); Yusuke Nakashima, Kanagawa (JP); Ryo Okuzumi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/327,159

(22) Filed: Jun. 1, 2023

(65) Prior Publication Data

US 2023/0305463 A1 Sep. 28, 2023

Related U.S. Application Data

(62) Division of application No. 17/341,800, filed on Jun. 8, 2021, now Pat. No. 11,709,448.

(30) Foreign Application Priority Data

Jun. 30, 2020 (JP) ................................ 2020-112788
Jun. 30, 2020 (JP) ................................ 2020-112789
Oct. 30, 2020 (JP) ................................ 2020-182965

(51) Int. Cl.
*G03G 15/20* (2006.01)
*G03G 15/00* (2006.01)

(52) U.S. Cl.
CPC ..... *G03G 15/2053* (2013.01); *G03G 15/2064* (2013.01); *G03G 15/5004* (2013.01)

(58) Field of Classification Search
None
See application file for complete search history.

(56) References Cited

U.S. PATENT DOCUMENTS

2002/0088789 A1* 7/2002 Hirai .................. G03G 15/2064 219/216
2011/0091236 A1 4/2011 Oi et al.
(Continued)

FOREIGN PATENT DOCUMENTS

CN 108227440 A 6/2018
JP H09127809 A 5/1997
(Continued)

OTHER PUBLICATIONS

Chinese Office Action issued on Dec. 30, 2023 in counterpart Chinese Patent Appln. No. 202110708705.9.
(Continued)

*Primary Examiner* — Sevan A Aydin
(74) *Attorney, Agent, or Firm* — Venable LLP

(57) ABSTRACT

A fixing unit includes a film including a tubular shape and configured to rotate, a heater arranged inside the film and including a heating resistor configured to generate heat by passing alternating current therethrough and an insulator configured to cover the heating resistor, a sliding member arranged between the heater and the film and configured to be in sliding contact with an inner surface of the film, the sliding member having electric conductivity, a pressing member configured to be in pressure contact with the sliding member across the film to form a nip portion between the sliding member and the pressing member, and a conductive member electrically connected to a ground potential via at least one impedance element. The sliding member is electrically connected to the conductive member.

13 Claims, 30 Drawing Sheets

(56) References Cited

U.S. PATENT DOCUMENTS

| | | | | |
|---|---|---|---|---|
| 2011/0297663 | A1 | 12/2011 | Ito | |
| 2014/0193170 | A1 | 7/2014 | Fukasaka et al. | |
| 2017/0090366 | A1 | 3/2017 | Sone | |
| 2017/0168411 | A1 | 6/2017 | Kouzaki et al. | |
| 2018/0267445 | A1 | 9/2018 | Morizaki et al. | |
| 2019/0196377 | A1 | 6/2019 | Hara et al. | |
| 2020/0033768 | A1* | 1/2020 | Furuichi | G03G 15/2039 |
| 2020/0249602 | A1* | 8/2020 | Inoue | G03G 15/657 |
| 2021/0003952 | A1* | 1/2021 | Ishida | G03G 15/2053 |
| 2021/0026280 | A1 | 1/2021 | Umeda et al. | |
| 2021/0263455 | A1* | 8/2021 | Kinukawa | G03G 15/80 |
| 2022/0082965 | A1 | 3/2022 | An et al. | |
| 2023/0185221 | A1* | 6/2023 | Ueno | G03G 15/2042 399/335 |

FOREIGN PATENT DOCUMENTS

| | | | |
|---|---|---|---|
| JP | 2011253072 | A | 12/2011 |
| JP | 2015099207 | A | 5/2015 |
| JP | 2016071197 | A | 5/2016 |
| JP | 2017107116 | A | 6/2017 |
| JP | 2018072512 | A | 5/2018 |
| JP | 2019117354 | A | 7/2019 |
| JP | 2020086234 | A | 6/2020 |

OTHER PUBLICATIONS

Japanese Office Action issued Mar. 19, 2024 in counterpart Japanese Patent Application No. 2020-112789.

* cited by examiner

FIXING UNIT AND IMAGE FORMING APPARATUS

BACKGROUND OF THE INVENTION

Field of the Invention

The present invention relates to a fixing unit used, for example, in an image forming apparatus adopting an electrophotographic system, and an image forming apparatus equipped with the fixing unit.

Description of the Related Art

An example of a fixing unit adopting a heat-fixing system that is installed in a printer or a copying machine adopting an electrophotographic system is equipped with a heater including a heating resistor provided on a substrate formed of ceramics and the like, a fixing film that moves while being in contact with the heater, and a pressure roller arranged to oppose the heater across the fixing film. A recording material that bears an unfixed toner image is heated while being nipped and conveyed at a nip portion, i.e., fixing nip portion, between the fixing film and the pressure roller, by which the toner image borne on the recording material is heated and fixed to the recording material.

According to the fixing unit adopting the above-mentioned heat-fixing system, image defects so-called AC-induced banding may occur when a recording material that has been left standing for a long time in a high temperature and high humidity environment is used. If the recording material is nipped in the fixing nip portion while transfer of toner image is performed, an AC (Alternating Current) voltage supplied from a commercial power supply to heat the heater may be transmitted to a transfer nip portion through the recording material and superposed to a DC (Direct Current) voltage applied to a transfer member. AC-induced banding refers to a phenomenon in which transfer current flowing between a transfer member and an image bearing member is fluctuated by waveform components of AC voltage that has been transmitted through the recording material, causing unevenness of transfer property, and as a result, image defects of density unevenness in the sub-scanning direction of the image appear. Japanese Patent Application Laid-Open Publication No. 2011-253072 proposes a technique of forming a conductive layer in a glass coating on a heater surface and grounding the conductive layer to reduce the influence of AC voltage applied to a heating element on the transfer process.

SUMMARY OF THE INVENTION

The present invention provides a fixing unit and an image forming apparatus capable of suppressing AC-induced banding.

According to one aspect of the invention, a fixing unit includes a film including a tubular shape and configured to rotate, a heater arranged inside the film and including a heating resistor configured to generate heat by passing alternating current therethrough and an insulator configured to cover the heating resistor, a sliding member arranged between the heater and the film and configured to be in sliding contact with an inner surface of the film, the sliding member having electric conductivity, a pressing member configured to be in pressure contact with the sliding member across the film to form a nip portion between the sliding member and the pressing member, and a conductive member electrically connected to a ground potential via at least one impedance element, wherein the fixing unit is configured to heat a toner image on a recording material and fix the toner image to the recording material while nipping and conveying the recording material at the nip portion, and wherein the sliding member is electrically connected to the conductive member.

According to another aspect of the invention, a fixing unit includes a film including a tubular shape and configured to rotate, a nip forming member arranged inside the film and including a heater configured to generate heat by passing alternating current therethrough, and a pressing member configured to be in pressure contact with the nip forming member across the film, wherein the fixing unit is configured to heat an image on a recording material and fix the image to the recording material while nipping and conveying the recording material by the film and the pressing member at a nip portion between the nip forming member and the pressing member, wherein the heater includes a substrate having electric conductivity, a first insulating layer formed of an insulating material on the substrate, a heating resistor formed on the first insulating layer and configured to generate heat by passing the alternating current therethrough, and a second insulating layer formed of an insulating material to cover the heating resistor, wherein the substrate is electrically connected to a ground potential, and wherein an impedance between the heating resistor and the ground potential to which the substrate is connected is lower than an impedance between the heating resistor and the nip portion.

According to still another aspect of the invention, a fixing unit includes a film including a tubular shape and configured to rotate, a heater electrically connected to an AC power supply and configured to generate heat by being supplied AC voltage from the AC power supply, a sliding member arranged between the heater and the film and configured to be in sliding contact with an inner surface of the film, the sliding member having electric conductivity, and a pressing member configured to be in pressure contact with the sliding member across the film to form a nip portion between the sliding member and the pressing member, wherein the fixing unit is configured to heat a toner image on a recording material and fix the toner image to the recording material while nipping and conveying the recording material at the nip portion, and wherein the fixing unit further includes a voltage application portion configured to apply AC voltage to the sliding member, the AC voltage applied to the sliding member having a waveform that takes a voltage value of an opposite polarity as a voltage value of the AC voltage supplied from the AC power supply when the AC voltage supplied from the AC power supply takes a peak value.

Further features of the present invention will become apparent from the following description of exemplary embodiments with reference to the attached drawings.

DESCRIPTION OF THE EMBODIMENTS

Embodiments according to the present disclosure will be described with reference to the drawings.

First Embodiment

Figure 1:
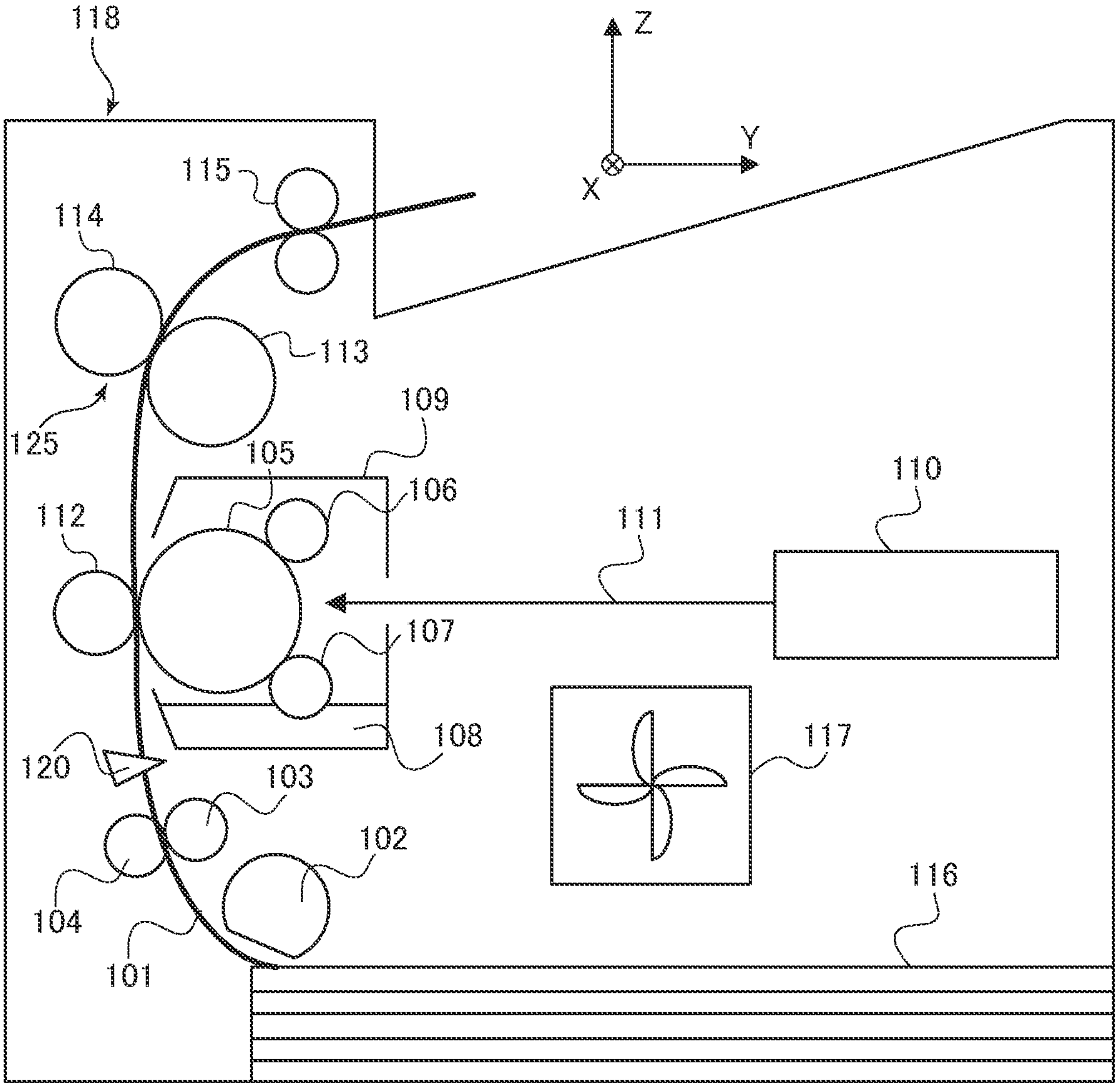
FIG. 1 is a schematic drawing of an image forming apparatus according to a first embodiment.

FIG. 1 is a configuration example of a laser beam printer (hereinafter referred to as a printer 118), which is an image forming apparatus according to a first embodiment. The printer 118 executes a printing operation, also referred to as an image forming operation or sheet feeding operation, for forming an image on a recording material, also referred to as recording medium, based on an image information entered, for example, through a network from an external information terminal. The term "image forming apparatus" refers not only to a single-function printer but also to a copying machine with a copying function or a multifunction machine with a plurality of functions.

When the printing operation is started, the printer 118 picks up one sheet of recording material 101 at a time from a sheet feed portion 116 using a feed roller 102 and conveys the sheet using conveyance rollers 103 and 104. After conveyance of the recording material 101 is started, passing of a leading edge and a trailing edge of the recording material 101 is detected by an optical sensor detecting a position of a sheet passage detection flag 120 that swings by being in contact with the recording material 101. By detecting the leading edge of the recording material 101, a controller of the printer 118 can determine a timing for starting each electrophotographic processes described hereafter.

The processing cartridge 109 is equipped with a photosensitive drum 105 that serves as an image bearing member, a charging roller 106 and a developing roller 107, and toner 108 serving as developer is stored in a cartridge container. When the printing operation is started, a high voltage is applied to the charging roller 106, and the surface of the photosensitive drum 105 is charged uniformly. Next, laser light 111 modulated based on the image information is projected onto the photosensitive drum 105 from a scanning optical device 110, and an image forming area is scanned and exposed, by which a charged pattern corresponding to the image information, which is called an electrostatic latent image, is formed on the surface of the photosensitive drum 105. Toner borne on the developing roller 107 is transferred to the photosensitive drum 105 in accordance with electric potential distribution on the surface of the photosensitive drum 105 and the high voltage applied to the developing roller 107, by which the electrostatic latent image is developed and visualized as a toner image.

The toner image formed on the surface of the photosensitive drum 105 is transferred to the recording material 101 by having a high voltage applied to a transfer roller 112 that serves as a transfer member. The recording material 101 to which toner image has been transferred is subjected to an image fixing process by a fixing unit 125 including a heating device 113 and a pressing member 114. Forming of image is completed by the recording material 101 having passed the fixing unit 125 being discharged to the exterior of the apparatus by a sheet discharge roller 115. When images are formed continuously to a plurality of recording materials 101, a conveyance start timing of a subsequent recording material 101 can be determined by detecting the trailing edge of the previous recording material 101 by the sheet passage detection flag 120. Furthermore, a fan 117 is provided in the printer 118. The fan 117 is provided to prevent the fixing of toner 108 in the processing cartridge 109 by the heat of the heating device 113 and to suppress the heating of electrical components such as a power supply device.

Various sheet materials having different sizes and materials can be used as the recording material 101, such as paper including plain paper and thick paper, plastic films, cloths, sheets subjected to surface treatment such as coated paper, or sheets having special shapes including envelopes and index sheets. Furthermore, a method where toner image is directly transferred from the photosensitive drum 105 to the recording material 101 has been described, but the present technique described hereafter can also be applied to an image forming apparatus adopting other types of techniques for transferring the toner image formed on the photosensitive member via an intermediate transfer body such as an intermediate transfer belt.

Hereafter, details of an image forming apparatus according to a reference example and principle of occurrence of AC-induced banding will be described with reference to FIGS. 2 to 5. The major configuration of a fixing unit according to the reference example is similar to that of the fixing unit 125 according to the first embodiment.

Details of Transfer and Fixing Portion According to Reference Example

At first, details of a transfer step to a fixing step in the image forming process will be described with reference to the schematic diagram of FIG. 2. As described earlier, the toner image formed on the photosensitive drum 105 is transferred to the recording material 101 by the high voltage applied to the transfer roller 112. The transfer roller 112 is pressed against the photosensitive drum 105, and a transfer nip Nt is formed between the recording material 101 and the transfer roller 112. Further, a direct current high voltage is applied to the transfer roller 112 from a transfer power supply 205. The high voltage, also referred to as a transfer voltage, applied to the transfer roller 112 is a DC voltage having an opposite polarity as a normal charge polarity of toner serving as developer.

Figure 2:
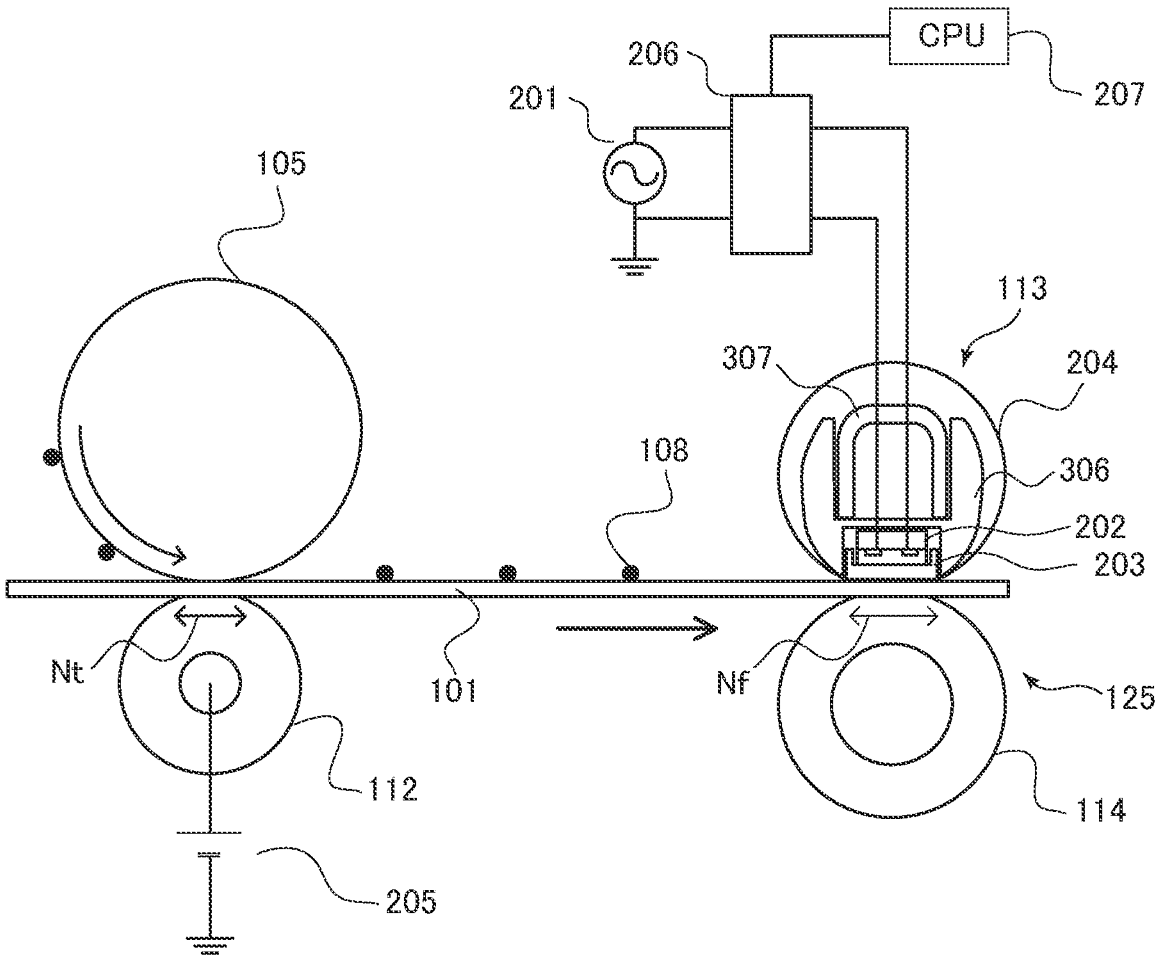
FIG. 2 is a schematic diagram illustrating details related to a transfer and fixing portion according to a reference example.

The toner image transferred to the recording material 101 is conveyed in the right direction of FIG. 2 and reaches the fixing unit 125. The heating device 113 of the fixing unit 125 is composed of a heater 202, a sliding plate 203 and a film 204, and a holding member 306 (refer to FIG. 3) for holding these components. The pressing member 114 of the fixing unit 125 is pressed against the heating device 113, and a fixing nip Nf is formed between the recording material 101 and the pressing member 114.

A commercial power supply 201 serving as an AC power supply and a control circuit 206 are connected to the heater 202. The heater 202 is driven by the AC voltage supplied from the commercial power supply 201 and generates heat.

A CPU 207 serving as the controller drives the control circuit 206 based on a temperature detected by a temperature detecting element provided in the heating device 113 and performs temperature control to maintain the heating device 113 to a predetermined temperature by controlling on and off of power supply to the heater 202. The temperature detecting element is, for example, a thermistor arranged between the heater 202 and the holding member 306.

The film 204 is formed by rolling a material having flexibility and heat resistance into a tubular shape, and for example, a material containing polyimide as a main component to which a high heat conduction filler composed of conductive carbon is added to enhance heat conductivity and provide electric conductivity can be used. A film formed of a resin material having an insulating property or a metal formed as a thin film can also be used as the film 204.

As shown in the drawing, the recording material 101 comes to be nipped both the transfer nip Nt and at the fixing nip Nf during execution of the printing operation. In this state, the transfer power supply 205 and the fixing nip Nf will be equivalent to an electrically connected state via an impedance of the recording material 101.

Cross-Sectional Configuration of Fixing Unit According to Reference Example

Next, a cross-sectional configuration of a fixing unit according to a reference example will be described with reference to FIG. 3. In the following description, axial directions X, Y and Z are the same as those illustrated in FIG. 1 regarding the shapes of the members and positional relationships among members. That is, a longitudinal direction of the fixing nip Nf, which is a direction perpendicular to a conveyance direction of the recording material at the fixing nip Nf, or main scanning direction when forming an image, is referred to as an "X-axis direction". Directions perpendicular to each other in a plane perpendicular to the X-axis direction are referred to as a Y-axis direction and a Z-axis direction.

Figure 3:
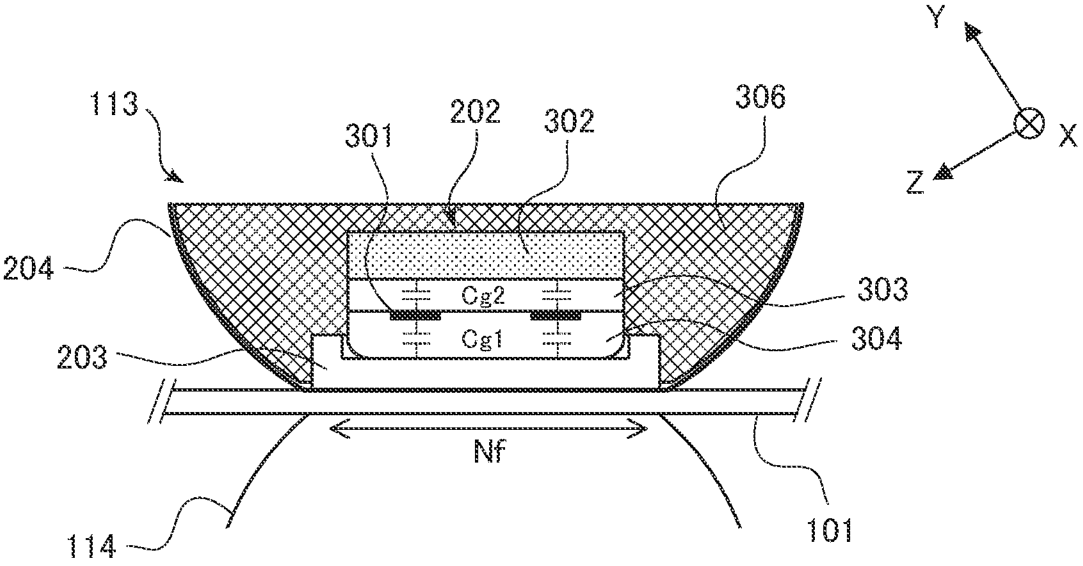
FIG. 3 is a cross-sectional view illustrating a cross-section of a portion of a fixing unit according to the reference example.

FIG. 3 is a view illustrating a cross-section, i.e., short direction cross-section, viewed in the X-axis direction of the fixing unit 125 according to the reference example cut in a virtual plane, i.e., YZ plane, that is perpendicular to the X-axis direction. The heater 202 includes a heating resistor 301 that generates heat by passing electric current therethrough, an electric conductor (not shown) for applying voltage to the heating resistor 301, a substrate 302 on which the heating resistor 301 and the electric conductor are formed in the X-axis direction and which is formed as a long thin plate shape extending in the X-axis direction. A ceramic material such as alumina or a metal material such as stainless steel can be used to form the substrate 302. Hereafter, the direction extending along a principal plane of the substrate 302 and that is perpendicular to the longitudinal direction, i.e., X-axis direction, is referred to as a short direction of the heater 202.

A glass coating serving as an insulating layer 303 is coated on the surface of the substrate 302 in an area where the heating resistor 301 is formed when the substrate 302 is viewed in the thickness direction, and the heating resistor 301 is formed on the insulating layer 303. The insulating layer 303 functions as a first insulating layer for insulating the substrate 302 and the heating resistor 301 to which a commercial power supply voltage is applied. A glass coating is further coated on the heating resistor 301 as a protective layer 304. The protective layer 304 is an insulator for insulating the heating resistor 301 and the sliding plate 203 having electric conductivity, and functions as a protective layer for protecting the heating resistor 301. Insulating materials other than glass can also be used to form the insulating layer 303 and the protective layer 304.

The holding member 306 holds the heater 202 and the sliding plate 203 and also rotatably supports the film 204 on the inner side of the film 204. The sliding plate 203 serving as a sliding member according to the present embodiment is arranged between the heater 202 and the film 204 in a state being held by the holding member 306 and in contact with an inner surface of the film 204. Therefore, the film 204 can rotate while being moved in sliding motion on the sliding plate 203 with the inner surface, i.e., inner circumferential surface, thereof.

The sliding plate 203 is arranged to equalize the heat, i.e., equalize temperature distribution, of the heater 202 in the X-axis direction, i.e., longitudinal direction, and to improve the sliding durability with the film 204, and it is formed, for example, of a metal material. The film 204 having heat resistance is moved in sliding motion while being pressed closely against an exposed surface of the sliding plate 203 by the pressing member 114 including an elastic layer. A roller member including a cylindrical core metal made of metal, and an elastic layer made of silicon rubber having heat resistance and elasticity provided on an outer circumference of the core metal can be used as the pressing member 114.

According to such pressing configuration, the sliding plate 203 and the pressing member 114 are in pressure contact with each other across the film 204, and the fixing nip Nf is formed between the sliding plate 203 and the pressing member 114. When the recording material 101 to which an unfixed toner image is formed is conveyed to the fixing nip Nf, the heat of the heating resistor 301 is applied via the sliding plate 203 and the film 204 to the toner image on the recording material 101. Toner is melted by the heat and thereafter cooled and solidified, according to which a fixed image fixed to the surface of the recording material 101 is obtained.

Now, as illustrated in FIG. 3 as a virtual capacitor (broken line), the heating resistor 301 and the substrate 302, and the heating resistor 301 and the sliding plate 203, are respectively capacitively coupled. Cg1 represents a capacity component of the protective layer 304, that is, a capacity component between the heating resistor 301 and the sliding plate 203 that are capacitively coupled via the protective layer 304. Cg2 represents a capacity component of the insulating layer 303, that is, a capacity component between the heating resistor 301 and the substrate 302 that are capacitively coupled through the insulating layer 303.

Equivalent Circuit of Reference Example

Figure 4:
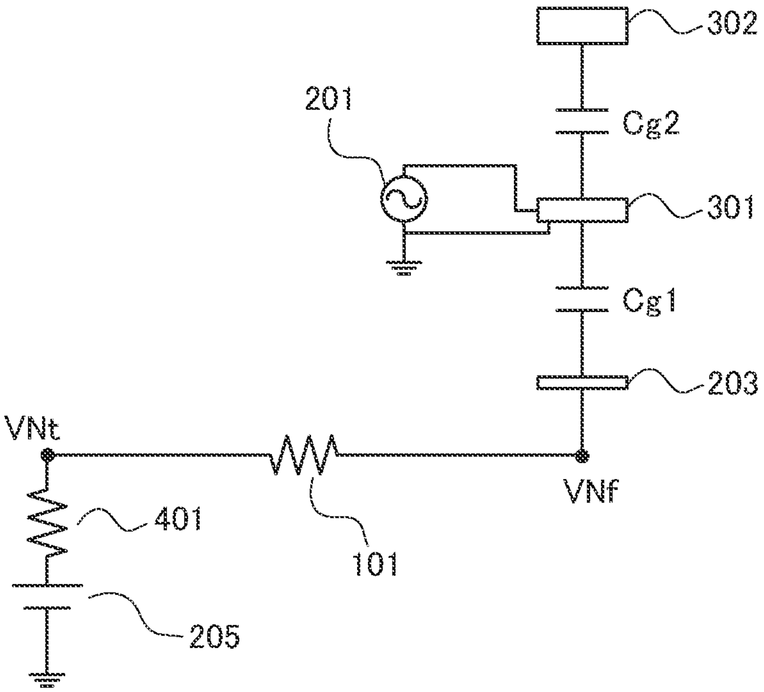
FIG. 4 is an equivalent circuit diagram of the image forming apparatus according to the reference example.

FIG. 4 illustrates an equivalent circuit diagram that is electrically equivalent to the image forming apparatus in a state where the recording material 101 is nipped by the transfer nip Nt and the fixing nip Nf according to the reference example. A transfer nip voltage VNt is applied to the transfer nip Nt by having the DC voltage generated by the transfer power supply 205 transmitted via an impedance 401 of the transfer roller 112.

The AC voltage of the commercial power supply 201 applied to the heating resistor 301 is transmitted via the capacity Cg1 of the protective layer 304 to the sliding plate 203, which is applied from the sliding plate 203 as a fixing nip voltage VNf to the fixing nip Nf. In this state, the transfer nip voltage VNt is influenced by the fixing nip voltage VNf based on the impedance of the recording material 101. In a high humidity environment, the recording material 101 absorbs moisture and the impedance of the recording material 101 is lowered. When the recording material 101 is nipped by both the transfer nip Nt and the fixing nip Nf in a state where the impedance of the recording material 101 is lowered, the fixing nip voltage VNf is superposed to the transfer nip voltage VNt.

Figure 5:
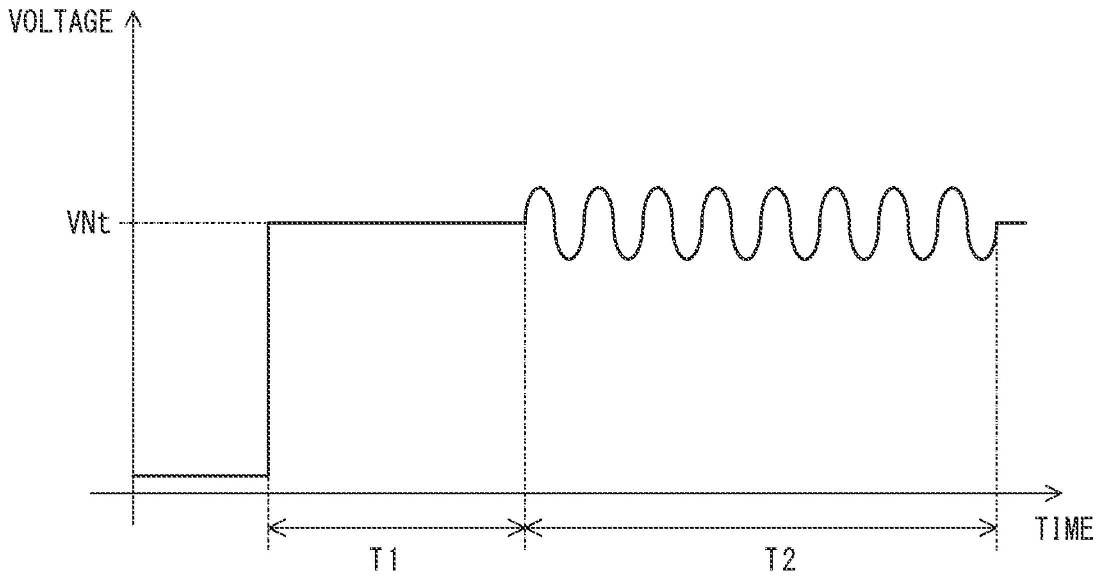
FIG. 5 is a view illustrating a voltage waveform at a transfer nip portion according to the reference example.
Figure 21:
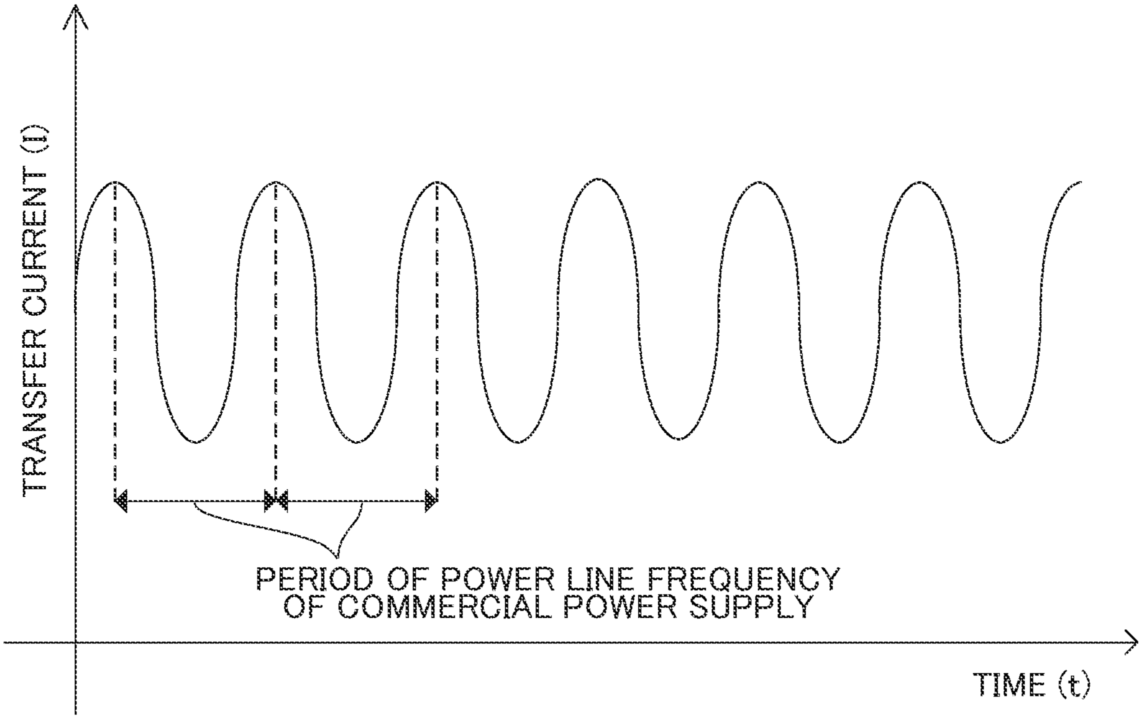
FIG. 21 is a view illustrating detection results of AC waveform components.

FIG. 5 is a view illustrating a measurement result of a voltage value at the transfer nip Nt. A period of time T1 of FIG. 5 is a period of time from when the leading edge of the recording material 101 enters the transfer nip Nt to when the leading edge of the recording material 101 enters the fixing nip Nf. A period of time T2 is a period of time from when the leading edge of the recording material 101 enters the fixing nip Nf to when the trailing edge of the recording material 101 passes through the transfer nip Nt. As described, when the fixing nip voltage VNf being oscillated is superposed to the transfer nip voltage VNt, the current, i.e., transfer current, flowing from the transfer nip Nt to the photosensitive drum 105 will oscillate cyclically at a power line frequency (or mains frequency) of the commercial power supply during the period of time T2. Thereby, as illustrated in FIG. 21, the current flowing to the transfer roller 112 will be fluctuated by the power line frequency of the commercial power supply.

Figure 22:
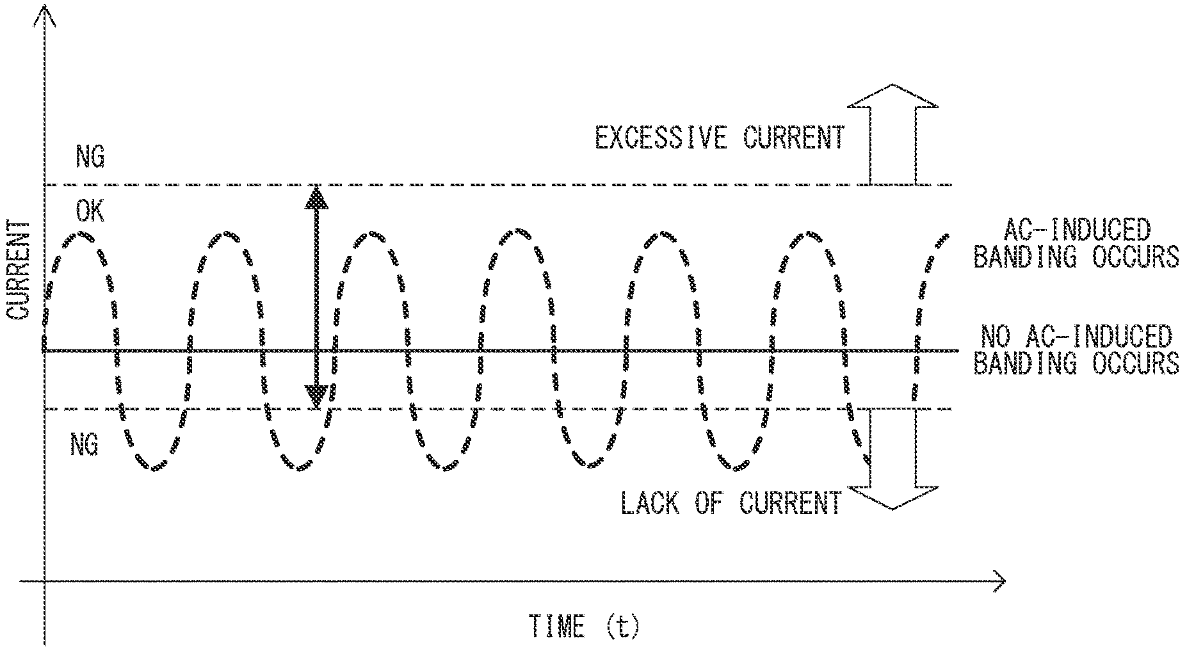
FIG. 22 is a view illustrating occurrence of AC-induced banding.
Figure 23:
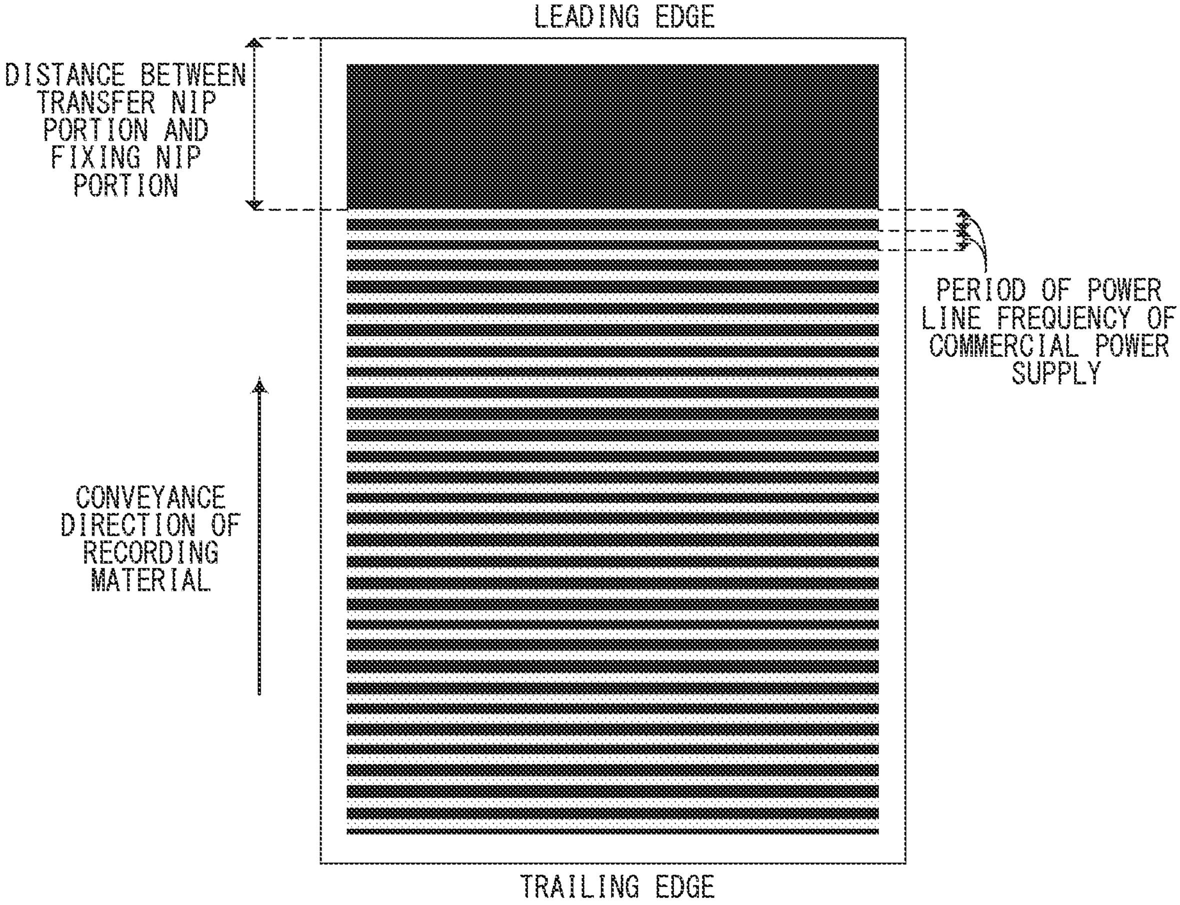
FIG. 23 is a view illustrating an image in which AC-induced banding has occurred.

FIG. 22 is a schematic diagram illustrating a state in which the fluctuation of current value at a transfer nip T is actualized as an AC-induced banding. FIG. 23 is a schematic diagram of an image where the AC-induced banding has occurred. As illustrated in FIG. 22, in a state where an amplitude of the current flowing from the transfer roller 112 to the photosensitive drum 105 is increased by the AC volage from the commercial power supply 201 being applied to the heating resistor 301, valleys of the waveform may fall below a proper range of the current for transferring the toner image to the recording material. As a result, lack of current occurs at a frequency corresponding to the power line frequency of the commercial power supply 201, and as illustrated in FIG. 23, unevenness of image density appears at intervals corresponding to the power line frequency of the commercial power supply 201 within the image transferred to the recording material 101 from the photosensitive drum 105 at a timing the recording material 101 has entered the fixing nip Nf. This phenomenon in which such unevenness of density occurs to the image at intervals corresponding to the power line frequency of the commercial power supply 201 is called an AC-induced banding.

Cross-Sectional Configuration of Fixing Unit According to First Embodiment

Figure 6:
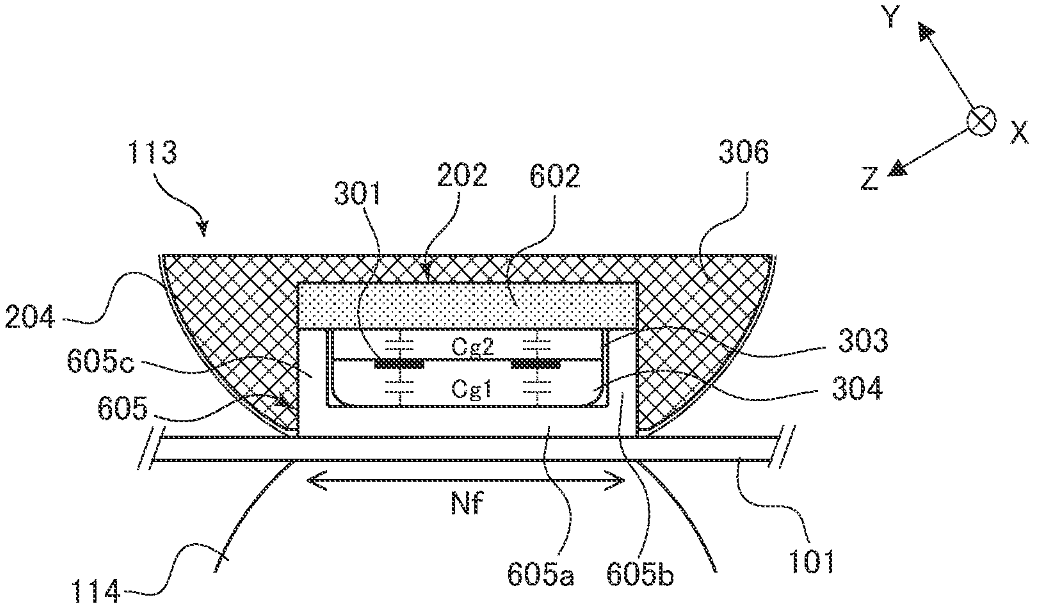
FIG. 6 is a cross-sectional view cut along a short direction of a portion of a fixing unit according to the first embodiment.
Figure 7:
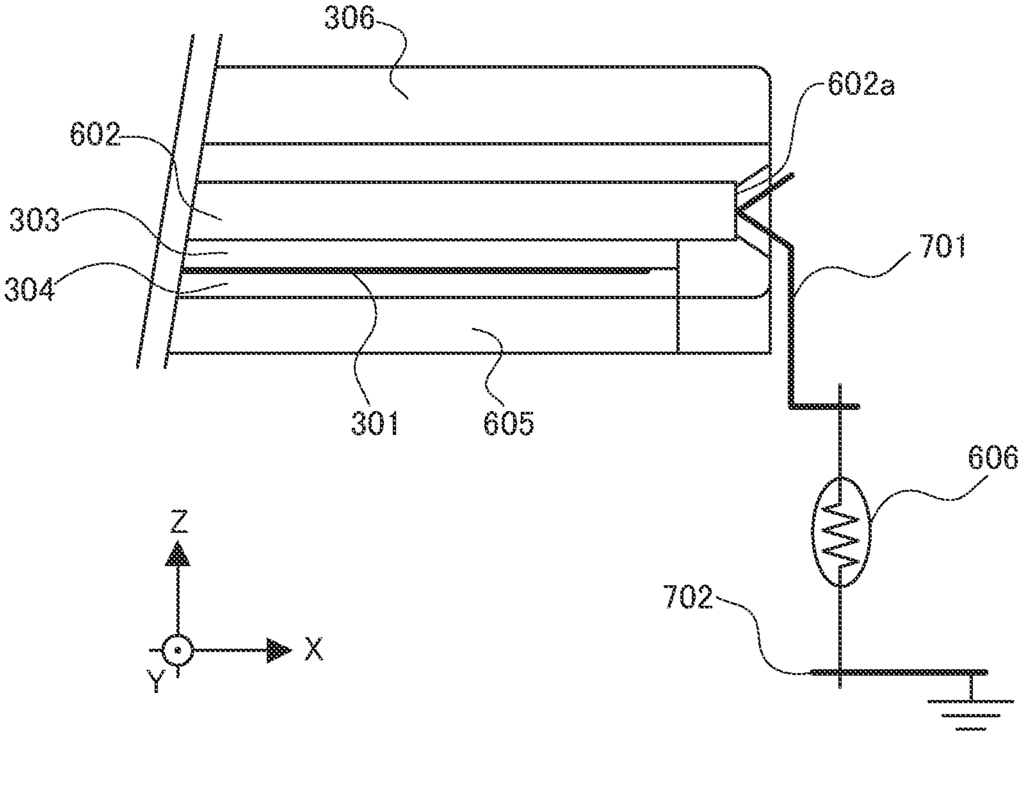
FIG. 7 is a cross-sectional view cut along a longitudinal direction of a portion of the fixing unit according to the first embodiment.

In order to cope with the AC-induced banding, the present embodiment adopts a configuration where a sliding plate 605 is electrically grounded via at least one impedance element, as illustrated in FIGS. 6 and 7. An "impedance element" refers generally to an element including, for example, a resistor, a capacitor, an inductor, or a combination thereof. In the present embodiment, a resistor is adopted as the impedance element. In the following description, elements that are assigned with the same reference numbers as the reference example have similar configurations and functions, so that the parts that differ from the reference example will mainly be explained.

As illustrated in FIG. 6, the heater 202 according to the present embodiment includes, the heating resistor 301 that generates heat by passing electric current therethrough, an electric conductor (not shown) for applying a voltage to the heating resistor 301, and a substrate 602 on which the heating resistor 301 and the electric conductor are formed along the X-axis direction and which is formed as a thin plate elongated in the X-axis direction. The substrate 602 can be formed of a ceramic material such as alumina or a metal material such as stainless steel, and the present embodiment illustrates an example where a metal material is used.

In the present embodiment, unlike the reference example, the sliding plate 605 and the substrate 602 are in contact with each other to be electrically connected (i.e., conductive) state. The substrate 602 is designed wider than the range of the insulating layer 303 so as to provide a contact portion with the sliding plate 605. In other words, the formation range of the insulating layer is limited to a portion of the surface of the substrate 602. The sliding plate 605 according to the present embodiment has a rectangular shape with one side open in cross-section viewed in the X-axis direction, that is, cross-section in the short direction, so as to connect to the substrate 602. In other words, the sliding plate 605 is shaped so that extended portions 605*b* and 605*c* are extended toward a direction separating from the fixing nip Nf from both end portions of a surface 605*a*, i.e., surface that extends in the conveyance direction of the recording material at the fixing nip Nf, in contact with an inner surface of the film 204. By the extended portions 605*b* and 605*c* being in contact with the substrate 602 exposed outside the range of the insulating layer 303, the sliding plate 605 is electrically communicated with the substrate 602. Since the substrate 602 is formed of a metal material, the substrate 602 and the sliding plate 605 would have electrically equal potentials.

The connection configuration of the sliding plate 605 and the substrate 602 described above is merely an example, and for example, a projected portion provided on the substrate 602 can be in contact with a planar sliding plate 605. The above-mentioned extended portions 605*b* and 605*c* in contact with the substrate 602 can be provided across the whole area of the sliding plate 605 in the X-axis direction or only at a portion(s) in the X-axis direction. Further, a configuration for electrically connecting the sliding plate 605 and the substrate 602 is not limited to connecting the sliding plate 605 and the substrate 602 in the short-direction cross-section.

FIG. 7 is a cross-sectional view viewed in the Y-axis direction of a portion of the fixing unit 125 according to the present embodiment cut along a virtual plane, i.e., XZ plane, along the X-axis direction, which illustrates a grounding structure of the substrate 602. A conductor 701 is in contact with an end face 602*a* of the substrate 602 in the X-axis direction, i.e., longitudinal direction. The end face 602*a* of the substrate 602 is cut after baking the heating resistor 301, the insulating layer 303 and the protective layer 304, so that the insulating coating on the surface of a stainless steel and the like is thin. Therefore, electrical connection of the end face 602*a* with the conductor 701 can be easily ensured. A metallic component having a shape with an elastic property, such as a leaf shape or a coil shape, is preferably used as the conductor 701.

The conductor 701 is connected to a first end of a resistor 606. A second end of the resistor 606 is connected to a conductor 702 being grounded, such as a metal frame of the fixing unit 125 fixed to a main body frame of the printer 118. The conductors 701 and 702 and the resistor 606 can be connected, for example, by forming cutouts to the conductors 701 and 702 for receiving terminals of the resistor 606, or by fixing the conductors 701 and 702 and the resistor 606 via screws and realizing electrical conduction. According to such configuration, the substrate 602 is electrically connected to a ground potential via the resistor 606.

Equivalent Circuit of First Embodiment

Figure 8:
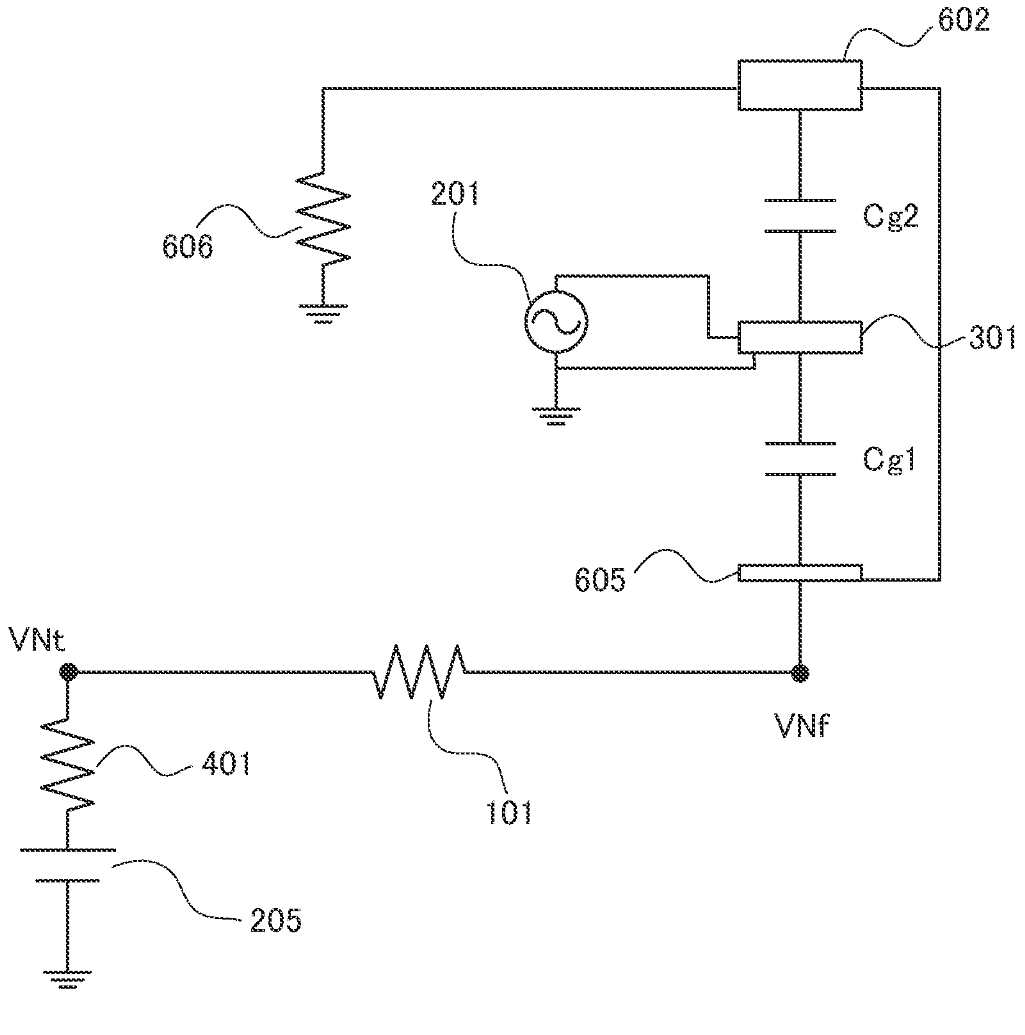
FIG. 8 is an equivalent circuit diagram of the image forming apparatus according to the first embodiment.

FIG. 8 illustrates an equivalent circuit diagram of a case where a configuration of a first embodiment as illustrated in FIGS. 6 and 7 is adopted. Unlike the reference example illustrated in FIG. 4, the sliding plate 605 and the substrate 602 are connected and would have electrically equal potentials. Current can be flown into and out of the sliding plate 605 via the substrate 602 and the resistor 606. Therefore, the AC voltage applied from the heating resistor 301 to the sliding plate 605 via Cg1, which is a capacity component of the protective layer 304, does not easily affect the fixing nip Nf.

In other words, according to the reference example of FIG. 4, a portion of the AC voltage applied to the heating resistor 301 has been superposed to the transfer voltage by a circuit passing through the recording material 101. In contrast, according to the present embodiment, a circuit that connects the sliding plate 605 and the substrate 602 via the resistor 606 to the ground potential has been added in parallel with the circuit as above, so that the combined impedance between the heating resistor 301 and the ground potential is reduced. As a result, the amplitude of voltage at the sliding plate 605 and the fixing nip Nf becomes small compared to the reference example, and the fluctuation range of the transfer nip voltage VNt can be suppressed even if the recording material 101 is in the moisture-absorbed state.

It is preferable to use a resistor having a lower resistance value than the recording material 101 in a moisture absorbing state as the resistor 606. For example, if the impedance of the recording material 101 having absorbed moisture is approximately 100 MΩ, the resistance value of the resistor would be preferably approximately a few MΩ to tens of MΩ. Thereby, even if the impedance of the recording material 101 is reduced by the influence of moisture absorption, the influence being superposed to the transfer nip voltage VNt can be reduced, and the occurrence of the AC-induced banding can be suppressed.

Incidentally, a certain type of connecting portion would be provided to directly connect the resistor 606 to the sliding plate 605 and to ground the same. In that case, a connecting portion with a connectable shape would be provided, for example, but since the sliding plate 605 has a function to conduct the heat from the heater 202 to the recording material 101, the increase in size of the sliding plate 605 may deteriorate the efficiency of heat transfer by the increase of heat capacity or deteriorate the balance, or uniformity, of heat distribution. Since the sliding plate 605 is arranged between the heater 202 and the film 204, it may be difficult to provide the connecting portion to the sliding plate 605. Meanwhile, the substrate 602 is held in the holding member 306, and it is relatively easy to contact the substrate 602 from the surface not having the glass coating, that is, the surface not opposed to the fixing nip Nf. Therefore, according to the present embodiment, the above-described concerns related to arrangement can be solved by connecting the sliding plate 605 via the substrate 602 made of metal to the resistor 606.

The substrate 602 made of metal electrically connected to the sliding plate 605 may be connected directly to the ground potential without interposing the resistor 606 therebetween. However, in that case, the impedance of the circuit connecting the fixing nip Nf via the sliding plate 605 and the substrate 602 to the ground potential is small compared to the present embodiment. As a result, when the leading edge of the recording material 101 receiving transfer of image at the transfer nip Nt reaches the fixing nip Nf, a portion of the current supplied from the transfer roller 112 escapes to the ground potential through the recording material 101 and the above-mentioned circuit, and the transfer efficiency of image is deteriorated, possibly leading to image defects. According to the present embodiment, the resistor 606 having an appropriate level of impedance is arranged, so that the deterioration of transfer efficiency of image does not occur easily.

As another method for coping with the AC-induced banding, Japanese Patent Application Laid-Open Publication No. 2011-253072 discloses forming a conductive layer within a glass coating of a heater and grounding the conductive layer. However, the number of manufacturing steps are increased to form the conductive layer in the glass coating, and component unit price of the heater rises. Further, sine a contact portion with the conductive layer is formed on the heater, unevenness of heat generation in the longitudinal direction or the increase of substrate area may be caused. In contrast, the present embodiment solves the problems mentioned above by grounding the sliding plate 605 having electric conductivity.

Modified Example

According to the first embodiment described above, the conductor 701 is connected to the end face 602*a* in the X-axis direction, i.e., longitudinal direction, of the substrate 602 for connection with the resistor 606, but the conductor 701 can also be connected to another surface of the substrate 602, for example, a surface opposite to the surface facing the fixing nip Nf. Further, an opening portion can be formed within the insulating layer 303 and the protective layer 304 of the substrate 602 to allow a projection formed on the sliding plate 605 to be connected to (in contact with) the substrate 602 through the opening portion.

According to the first embodiment, the sliding plate 605 is connected through the substrate 602 made of metal to the resistor 606 by taking the arrangement into consideration, but if the increase of heat capacity falls within an allowable range even when a connecting portion is formed, the sliding plate 605 can be connected to the ground potential without interposing the substrate 602 therebetween. In that case, the substrate 602 can be formed of a material having an insulating property such as ceramics. Further, even if the sliding plate 605 is connected to the resistor 606 via the substrate 602, for example, the main body of the substrate 602 can be formed of a material having an insulating property, and a conductive layer such as a thin metal coating can be formed on the surface of the main body.

Second Embodiment

An embodiment having a grounding structure that differs from the first embodiment will be described as a second embodiment with reference to FIGS. 9 to 11. Hereafter, elements assigned with the same reference numbers as the first embodiment adopt substantially the same configurations and functions as the first embodiment, so that the parts that differ from the first embodiment will mainly be illustrated.

Cross-Sectional Configuration of Fixing Unit According to Second Embodiment

Figure 9:
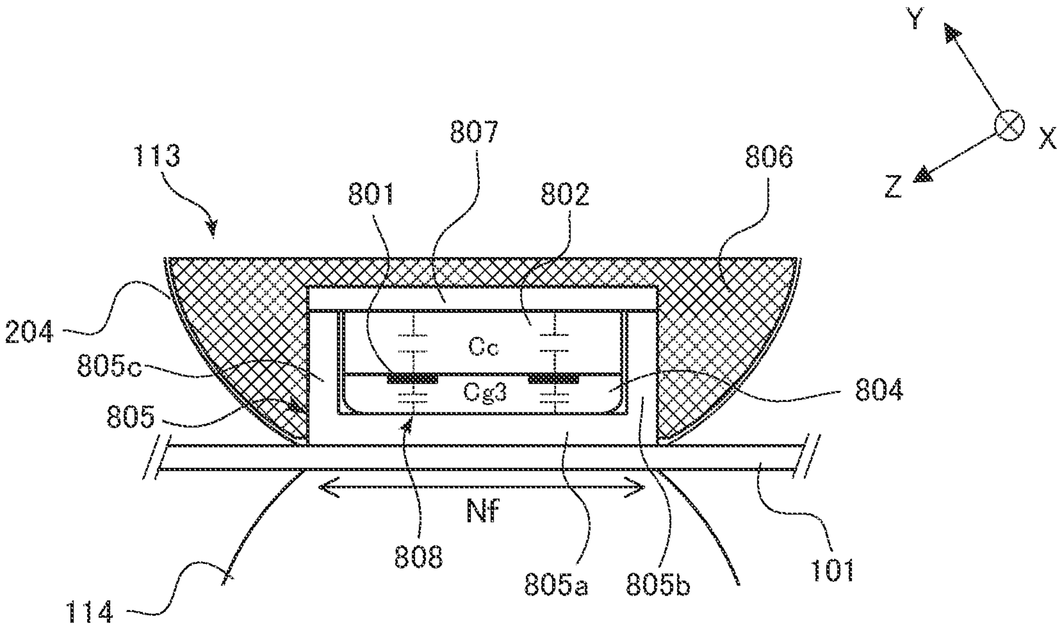
FIG. 9 is a cross-sectional view cut along a short direction of a portion of a fixing unit according to a second embodiment.

FIG. 9 is a cross-sectional view of the fixing unit 125 according to the present embodiment. The heating device 113 of the fixing unit 125 includes a heater 808, a sliding plate 805, a heat equalizing member 807, the film 204, and a holding member 806 for holding these components. The heater 808 includes a heating resistor 801 that generates heat when passing electric current therethrough, an electric conductor (not shown) for applying a voltage to the heating resistor 801, and a substrate 802 on which the heating resistor 801 and the electric conductor are formed along the X-axis direction and which is formed as a thin plate elongated in the X-axis direction. According to the present embodiment, a ceramic material such as alumina is used to form the substrate 802.

A glass coating 804 is applied to a surface of the substrate 802 to cover the area where the heating resistor 801 is formed when the substrate 802 is viewed in the thickness direction. The glass coating 804 functions both as an insulating layer for insulating the heating resistor 801 to which a commercial power supply voltage is applied and the sliding plate 203 having electric conductivity, and as a protective layer for protecting the heating resistor 801.

The heat equalizing member 807 has a function to equalize temperature distribution in the longitudinal direction of the fixing nip Nf. The heat equalizing member 807 is a plate-shaped member formed of a highly heat-conductive material such as aluminum, and it is arranged between the heater 808 and the holding member 806. The heat equalizing member 807 is an electric conductive material having a high thermal conductivity provided with the aim to raise the temperature of a non-sheet passing area, or to improve (suppress) the unevenness of detected temperature. The non-sheet passing area is an area outside a sheet passing area through which the recording material passes during the printing operation with respect to the X-axis direction. The heat equalizing member 807 can be a member that extends approximately across the same area as the heating resistor 801 or across a range that includes the area and extending in the X-axis direction.

Now, as illustrated as a virtual capacitor (broken line) in FIG. 9, the heating resistor 801 and the sliding plate 805 are capacitively coupled, and the heating resistor 801 and the heat equalizing member 807 are also capacitively coupled. Cg3 denotes a capacity component of the glass coating 804, that is, a capacity component between the heating resistor 801 and the sliding plate 805 that are capacitively coupled via the glass coating 804. Cc denotes a capacity component of the substrate 802, that is, a capacity component between the heating resistor 801 and the heat equalizing member 807 that are capacitively coupled via the substrate 802.

In the present embodiment, the width of the heat equalizing member 807 is formed wider than the width of the substrate 802 regarding the short direction of the substrate 802, and the sliding plate 805 is connected to the heat equalizing member 807 via both ends of the substrate 802 in the short direction. In other words, the sliding plate 805 has a rectangular shape with one side open in section viewed in the X-axis direction, that is, cross-section of the short side, so as to connect to the heat equalizing member 807. In other words, the sliding plate 805 is shaped so that extended portions 805*b* and 805*c* are extended toward a direction separating from the fixing nip Nf from both end portions of a surface 805*a*, i.e., surface that extends in the conveyance direction of the recording material at the fixing nip Nf, in contact with an inner surface of the film 204. By the extended portions 805*b* and 805*c* being in contact with the heat equalizing member 807, the sliding plate 805 is communicated with the heat equalizing member 807. Since the heat equalizing member 807 is formed of a conductive material, the heat equalizing member 807 and the sliding plate 805 would have electrically equal potentials.

Figure 10:
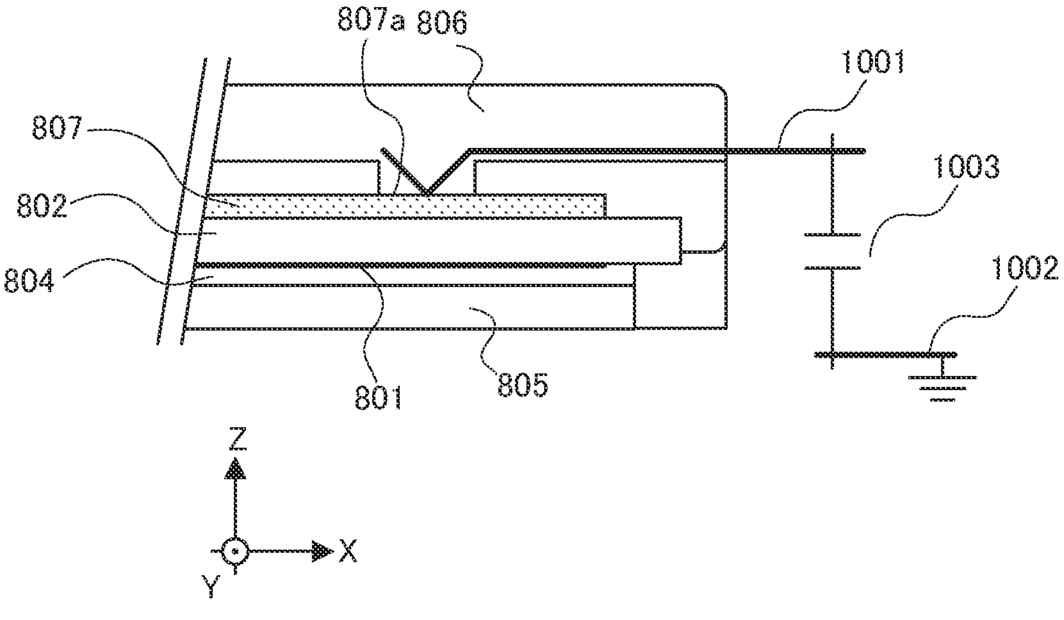
FIG. 10 is a cross-sectional view cut along a longitudinal direction of a portion of the fixing unit according to the second embodiment.

FIG. 10 is a cross-sectional view in the Y-axis direction of a portion of the fixing unit 125 according to the present embodiment cut along a virtual plane, i.e., XZ plane, along the X-axis direction, which illustrates a grounding structure of the heat equalizing member 807. A conductor 1001 held by the holding member 806 is in contact with a surface 807*a* that is opposite to a contact surface of the heat equalizing member 807 in contact with the substrate 802, that is, the surface facing the fixing nip Nf. A metallic component shaped to have a spring-like property is preferably used as the conductor 1001. The conductor 1001 is in contact with the heat equalizing member 807 at one end and exposed to the exterior of the holding member 806 on the other end. According to this configuration, a conduction path for grounding the sliding plate 805 can be ensured within the holding member 806, and the structure can be downsized.

In the present embodiment, a capacitive impedance 1003, or capacitor, is used as the impedance element. The conductor 1001 is connected to a first end of the capacitive impedance 1003. A second end of the capacitive impedance 1003 is connected to a conductor 1002 being grounded, such as a frame of the fixing unit 125 fixed to the main body frame of the printer 118. The conductors 1001 and 1002 and the capacitive impedance 1003 can be connected, for example, by forming cutouts to the conductors 1001 and 1002 for receiving terminals of the capacitive impedance 1003, or by fixing the conductors and the capacitive impedance via screws and realizing electrical conduction. According to such configuration, the heat equalizing member 807 is electrically connected to a ground potential via the capacitive impedance 1003.

Equivalent Circuit of Second Embodiment

Figure 11:
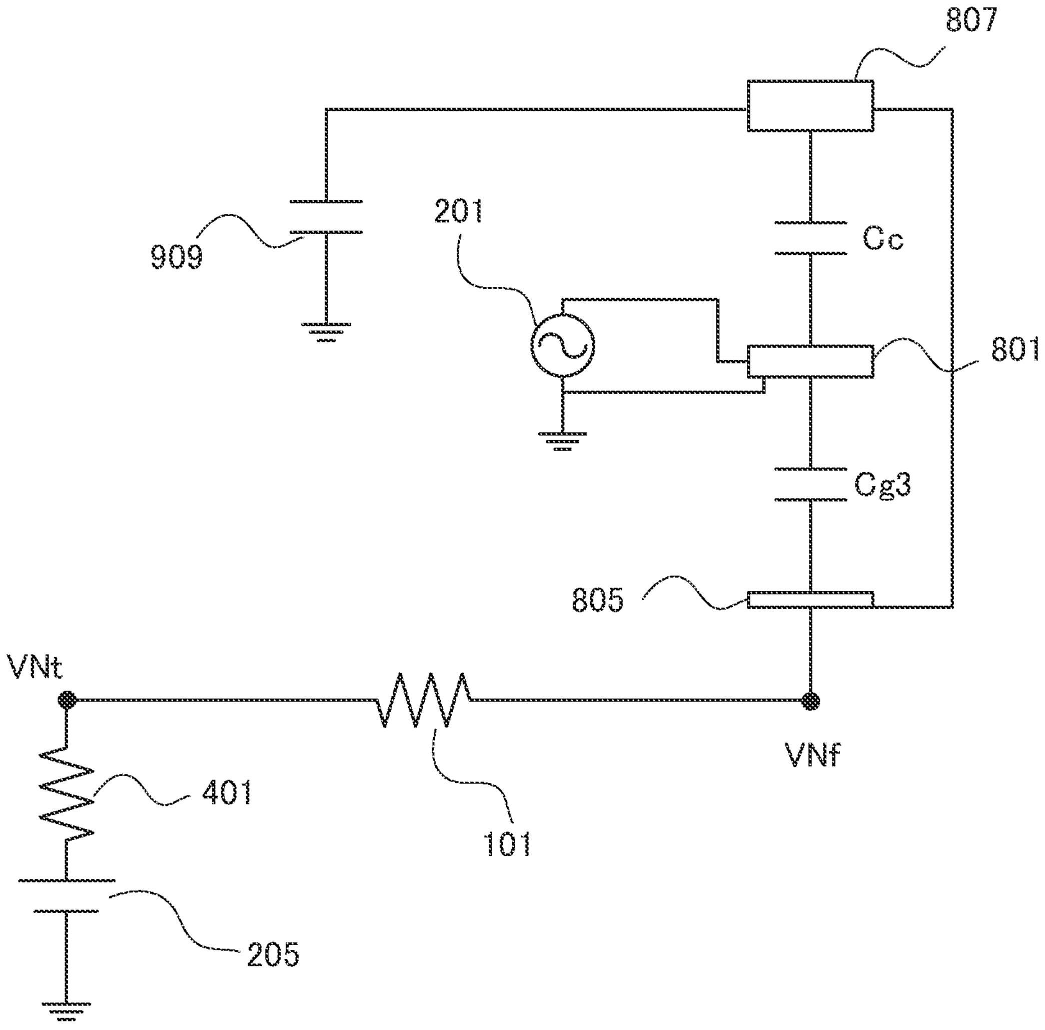
FIG. 11 is an equivalent circuit diagram an image forming apparatus according to the second embodiment.

FIG. 11 illustrates an equivalent circuit diagram of a case where the configuration of the second embodiment illustrated in FIGS. 9 and 10 is adopted. Unlike the reference example illustrated in FIG. 4, the sliding plate 805 and the heat equalizing member 807 are connected and would have electrically equal potentials. Current can be flown into and out of the sliding plate 805 through the heat equalizing member 807 and the capacitive impedance 1003. Therefore, the AC voltage applied from the heating resistor 801 to the sliding plate 805 via Cg3 which is a capacity component of the glass coating 804 does not easily affect the fixing nip Nf. Even according to the present embodiment, by arranging the capacitive impedance 1003 having an appropriate level of impedance, deterioration of transfer efficiency of image caused by a portion of the transfer current escaping through the recording material, the sliding plate 805 and the heat equalizing member 807 to the ground potential will not easily occur.

The capacitive impedance 1003 sets the impedance according to the power line frequency of the commercial power supply to be lower than the resistance value in a state where the recording material 101 has absorbed moisture. For example, if the power line frequency of the commercial power supply is 50 Hz and the impedance of the recording material 101 is 100 MΩ, the capacitive impedance 1003 can merely be approximately a few hundred pF. Further, in the case of capacitive impedance, since it has a frequency characteristic, the effect to the respective power supplies can be selected so that the capacitive impedance acts as a high impedance is for the DC voltage of the transfer power supply 205 and as a low impedance for the commercial power supply 201.

The heat equalizing member 807 can also be grounded via a circuit that connects a resistor as described in the first embodiment and a capacitive impedance in series. Thereby, even if the impedance of the recording material 101 drops by the influence of moisture absorption, the influence being superposed to the transfer nip voltage VNt can be reduced, and the occurrence of image unevenness can be suppressed even further.

Modified Example

The grounding of the sliding member is not limited to be realized via a heater substrate made of metal described in the first embodiment or the heat equalizing member 807 described in the second embodiment, and it can be grounded via a different conductive member included in the fixing unit. For example, if there is a stay 307 (FIG. 2) made of metal fixed to the frame member of the fixing unit as a reinforcing member for reinforcing the holding members 306 and 806 according to the first and second embodiments, the sliding member can be connected to the stay and the stay can be grounded via an impedance element. The stay 307 is a member having stiffness that extends in the longitudinal direction of the fixing nip and that supports the holding member 306 through a spring, wherein the sliding plate 203 is in pressure contact with the pressing member 114 via the film 204 by the urging force of the spring.

According to the first and second embodiments, a sliding plate in the shape of a plate has been described as an example of the sliding member, but the member can be a thin sheet-shaped member having flexibility, such as a sheet member made of iron alloy or aluminum. Further, a simple configuration of connecting the heater to the commercial power supply is adopted in the first and second embodiments, but the configuration of the present technique can also be applied to a configuration where the heater receives power from an AC power supply that differs from the commercial power supply to generate heat.

Third Embodiment

A fixing unit according to a third embodiment will be described. The elements that are assigned with the same reference numbers as the first embodiment have substantially the same configurations and functions as the first embodiment, unless denoted otherwise.

Cross-Sectional Configuration of Fixing Unit

Figure 12:
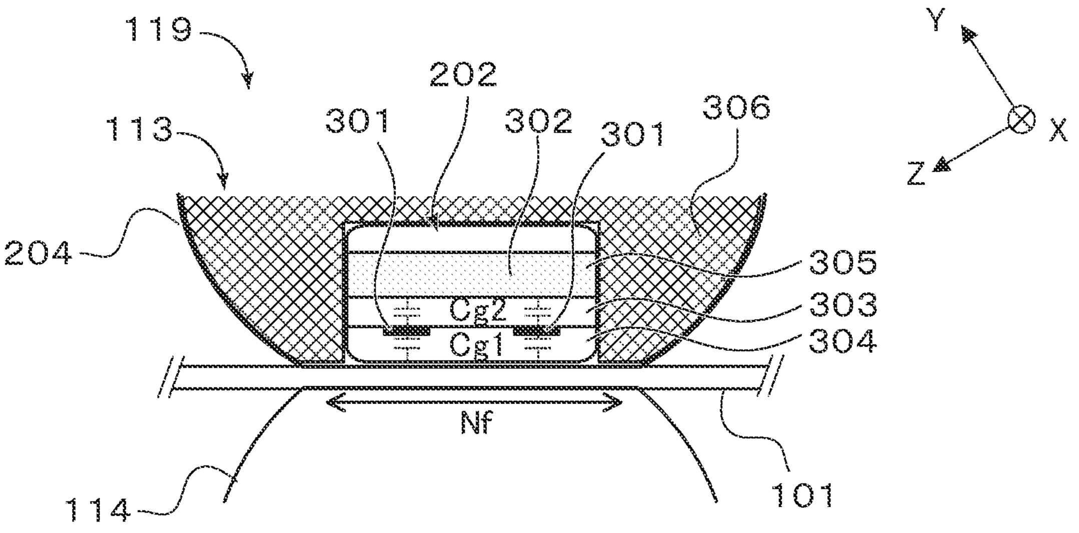
FIG. 12 is a cross-sectional view of a fixing unit according to a third embodiment.

FIG. 12 illustrates a cross-sectional configuration of the heating device 113 according to the present embodiment, that is, a cross-sectional view perpendicular to the longitudinal direction of the heater 202 viewed in the longitudinal direction. The heater 202 includes a heating resistor 301 that generates heat when electric current is passed therethrough, an electric conductor (not shown) for applying voltage to the heating resistor 301, and a substrate 302 on which the heating resistor 301 and the electric conductor are formed in the longitudinal direction and which is formed as a long thin plate extending in the longitudinal direction. A ceramic material such as alumina or a metal material such as stainless steel can be used to form the substrate 302. In the present embodiment, a metal material is used as the substrate 302 of the heater 202.

The insulating layer 303 made of an insulating material such as glass is formed on the substrate 302 in an area where the heating resistor 301 is formed in a state where the substrate 302 is viewed in the direction perpendicular to the principal plane of the substrate 302, so as to insulate the substrate 302 having electric conductivity and the heating resistor 301 to which a commercial power supply voltage is applied. The heating resistor 301 is formed on the insulating layer 303, i.e., first layer, serving as a first insulating layer. Further, the protective layer 304 formed of an insulating material serving as a second insulating layer is formed to cover the heating resistor 301 to protect the heating resistor 301.

Further, in order to prevent warping of the substrate 302 during manufacture, an insulating layer 305 is further formed on a surface of the substrate 302 opposite to the surface having the heating resistor 301. The material of the insulating layers 303, 305 and the protective layer 304 is not specifically limited, but a material having heat resistance is selected in consideration of the temperature for actual application. For example, a glass or a PI (polyimide) material is preferable as the material of the insulating layers 303, 305 and the protective layer 304.

The holding member 306 holds the heater 202 and the film 204. The heater 202 is held inside a groove formed in the holding member 306 along the longitudinal direction, and the heater 202 is arranged together with the holding member 306 in an inner circumference space, i.e., inner space, of the film 204. The film 204 is a tubular film having heat resistance and flexibility.

The pressing member 114 is a roller having an elastic layer and pressed by a pressurizing mechanism not shown to be abutted against the heater 202 across the film 204, by which the fixing nip Nf is formed. That is, the heater 202 and the holding member 306 function as a nip forming member for forming the fixing nip Nf together with the pressing member 114.

The pressing member 114 rotates by a driving force supplied from a motor not shown, according to which the film 204 is guided by the holding member 306 and rotates while having the inner surface (i.e., inner circumferential surface) thereof slide against an outermost layer of the heater 202, which in the present example is the protective layer 304. Then, the recording material 101 is nipped and conveyed by the pressing member 114 and the film 204 at the fixing nip Nf, and heat from the heater 202 is applied via the film 204 to the toner image on the recording material 101. Thereby, the toner is heated and pressed to be softened and then solidified on the recording material 101, by which a fixed image fixed to the recording material 101 is obtained.

Equivalent Circuit of Comparative Example

Figure 13A:
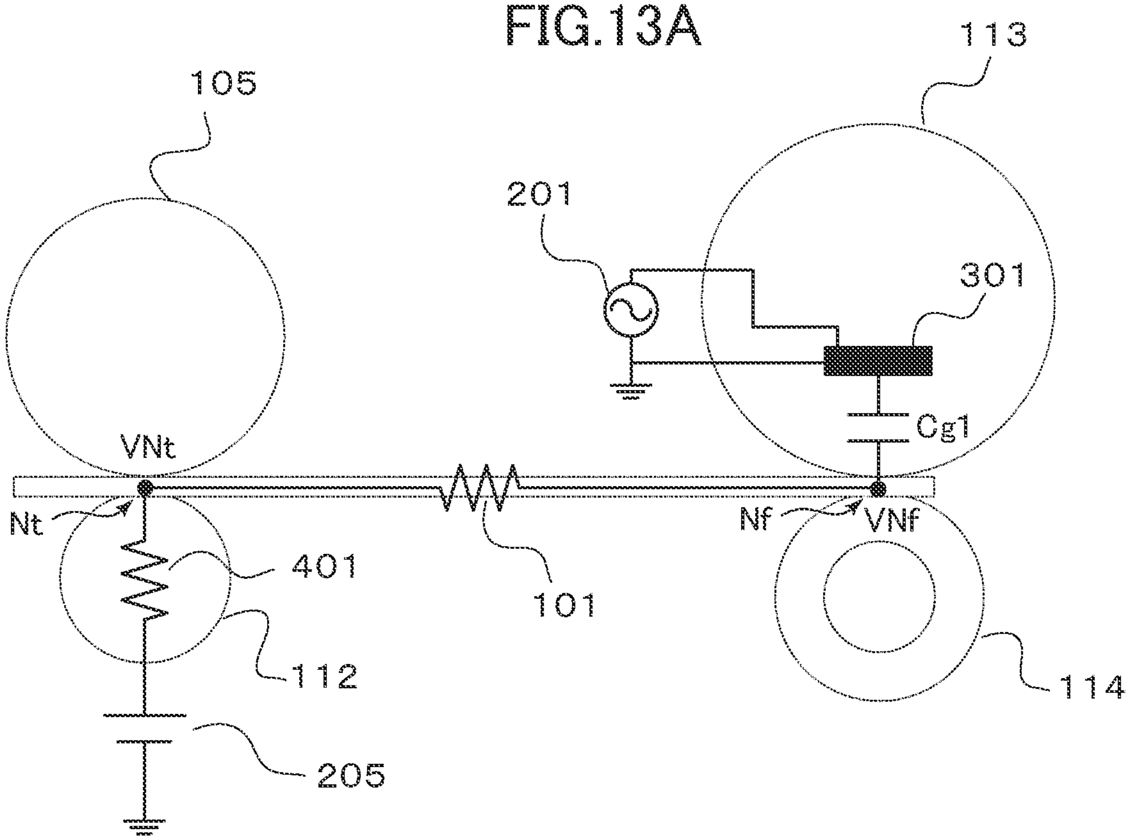
FIG. 13A illustrates an equivalent circuit of an image forming apparatus according to a comparative example.
Figure 13B:
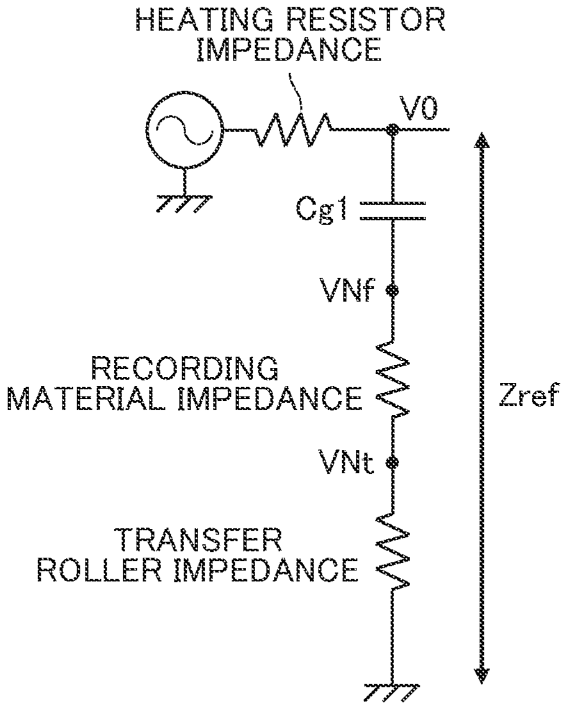
FIG. 13B illustrates an equivalent circuit of the image forming apparatus according to the comparative example.

An equivalent circuit of the printer 118 and the AC-induced banding according to a comparative example will be described with reference to FIGS. 13A, 13B and FIG. 5. FIG. 13A shows an electric circuit configuration of the printer 118 in a state where the recording material 101 is nipped by the transfer nip Nt and the fixing nip Nf, and FIG. 13B is an equivalent circuit diagram thereof. If the recording material 101 is nipped by both the transfer nip Nt and the fixing nip Nf as illustrated in FIG. 13A, the transfer nip Nt and the fixing nip Nf are connected electrically via the recording material 101. In other words, in a state where the recording material 101 is nipped by both the transfer nip Nt and the fixing nip Nf, the transfer nip Nt and the fixing nip Nf are connected via the impedance of the recording material 101 in the equivalent circuit (FIG. 13B).

The heating resistor 301 of the heater 202 and the film 204 are capacitively coupled via the protective layer 304 (refer to FIG. 12). In FIG. 12, Cg1 denotes a capacity component of the protective layer 304, that is, a capacity component between the heating resistor 301 and the film 204 that are capacitively coupled via the protective layer 304.

As illustrated in FIG. 13A, the transfer nip Nt is connected to the transfer power supply 205 via the impedance 401 of the transfer roller 112. By having the DC voltage generated at the transfer power supply 205 applied to the transfer roller 112, a transfer nip voltage VNt is applied to the transfer nip Nt. Meanwhile, by having the AC voltage of the commercial power supply 201 applied to the heating resistor 301, a fixing nip voltage VNf is applied to the fixing np Nf via the capacity Cg1 of the protective layer 304. When the recording material 101 is nipped by both the transfer nip Nt and the fixing nip Nf, the fixing nip voltage VNf transmitted via the recording material 101 is superposed to the transfer nip voltage VNt (FIG. 5). Then, if the impedance of the recording material 101 is reduced, for example, by the recording material 101 absorbing moisture, the fluctuation range of the transfer current exceeds the permissible range, and AC-induced banding occurs as described earlier (FIGS. 20 to 22).

Equivalent Circuit of Present Embodiment

Figure 14A:
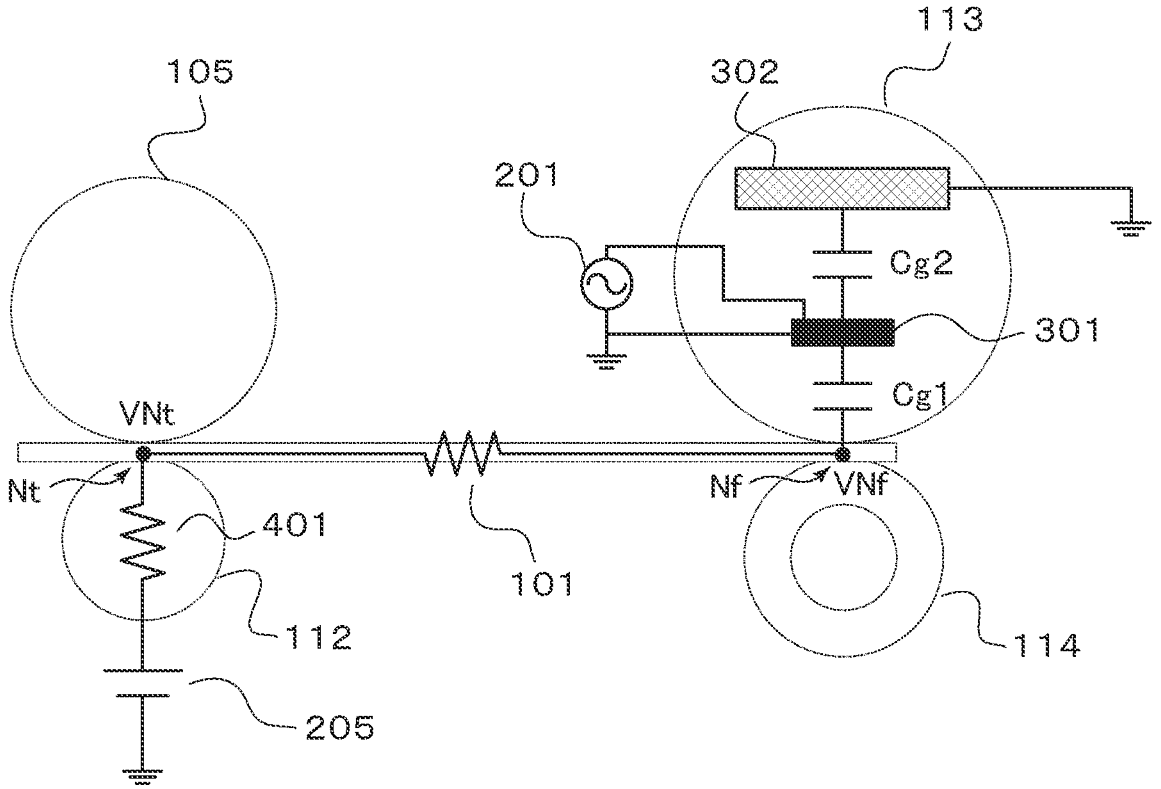
FIG. 14A illustrates an equivalent circuit of an image forming apparatus according to the third embodiment.
Figure 14B:
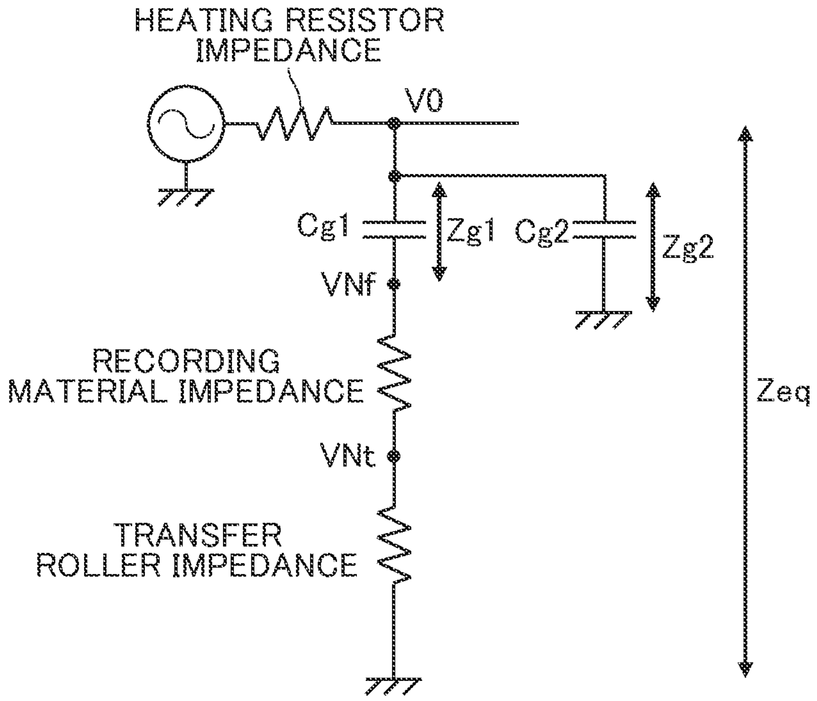
FIG. 14B illustrates an equivalent circuit of the image forming apparatus according to the third embodiment.

Now, an equivalent circuit of the printer 118 according to the present embodiment will be illustrated in FIGS. 14A and 14B. The heating resistor 301 and the substrate 302 of the heater 202 are capacitively coupled via the insulating layer 303, and the heating resistor 301 and the film 204 are capacitively coupled via the protective layer 304 (refer to FIG. 12). Cg1 denotes a capacity component of the protective layer 304, that is a capacity component between the heating resistor 301 and the film 204 that are capacitively coupled via the protective layer 304, and Cg2 denotes a capacity component of the insulating layer 303, that is, a capacity component formed between the heating resistor 301 and the substrate 302 that are capacitively coupled via the insulating layer 303.

If the impedance of the capacity Cg1 of the protective layer 304 is denoted by Zg1 [Ω] and the impedance of the capacity Cg2 of the insulating layer 303 is denoted by Zg2 [Ω], the respective impedances Zg1 and Zg2 are represented by the following expressions (1) and (2).

Expression (1)

$$Zg1 = j\frac{1}{2\pi f(Cg1)} \tag{1}$$

Expression (2)

$$Zg2 = j\frac{1}{2\pi f(Cg2)} \tag{2}$$

Wherein, f denotes a power line frequency [Hz] of the commercial power supply 201, and j denotes an imaginary unit.

In the present embodiment, the substrate 302 is connected to the ground potential, and impedances Zg1 and Zg2 represented by the above expressions (1) and (2) are set to satisfy a following inequality (3). In other words, the impedance Zg2 of the insulating layer 303 is set to be lower than the impedance Zg1 of the protective layer 304. That is, the impedance Zg2 between the heating resistor 301 and the substrate 302 capacitively coupled via the insulating layer 303, i.e., first insulating layer, is lower than the impedance Zg1 between the heating resistor 301 and the fixing nip Nf capacitively coupled via the protective layer 304, i.e., second insulating layer.

Expression (3)

$$|Zg1|>|Zg2| \tag{3}$$

As an actual example, if the power line frequency f of the commercial power supply is 50 Hz and the capacity Cg1 of the protective layer 304 is 400 pF, the impedance Zg1 of the protective layer 304 will be 8.0 MΩ based on Expression (1). In order to satisfy Expression (3), in this example, a material having a lower dielectric constant than the material used for the protective layer 304 is used as the material for the insulating layer 303, and the capacity Cg2 is set to approximately 600 pF. In this case, based on Expression (2), the magnitude of the impedance Zg2 of the insulating layer 303 will be 5.3 MΩ.

As described, according to the present embodiment, the impedance Zg2 of the insulating layer 303 is set lower than the impedance Zg1 of the protective layer 304, and the substrate 302 is connected to the ground potential. Thereby, the AC voltage component superposed to the transfer nip voltage VNt via the recording material 101 when the commercial power supply voltage is applied to the heating resistor 301 can be reduced.

The reason why the AC voltage component superposed to the transfer nip voltage VNt is reduced according to the configuration of the present embodiment can be explained as below in comparison with the comparative example illustrated in FIG. 13B. As illustrated in FIG. 14B, according to the present embodiment, a path (electric path or partial circuit) passing the impedance Zg2 of the insulating layer 303 is connected in parallel to the path passing the fixing nip Nf via the impedance Zg1 of the protective layer 304. Now, the impedance of a path passing the protective layer 304 according to the comparative example is referred to as Zref (FIG. 13B), and the combined impedance of the path passing the protective layer 304 and the path passing the insulating layer 303 according to the present embodiment is referred to as Zeq (FIG. 14B). The magnitude of the combined impedance Zeq is smaller than the impedance Zref of the comparative example, so that an amplitude of voltage V0 of FIG. 14B is smaller than an amplitude of voltage V0 of FIG. 13B. Therefore, by connecting the path passing the insulating layer 303 in parallel, the amplitude of the fixing nip voltage VNf applied via the protective layer 304 to the fixing nip Nf is small.

Further according to the present embodiment, the impedance Zg2 of the insulating layer 303 is set to be smaller than the impedance Zg1 of the protective layer 304. In other words, according to the present embodiment, the impedance of the path from the heating resistor 301 via the insulating layer 303 to the ground potential is set to be lower than the impedance of the path from the heating resistor 301 via the protective layer 304 to the fixing nip Nf. In this case, compared to a case where the impedances Zg1 and Zg2 of the insulating layer 303 and the protective layer 304 are equivalent, the amplitude of voltage V0 is greatly reduced in width of a case where the path passing the insulating layer 303 is connected in parallel. As a result, the amplitude of the fixing nip voltage VNf applied to the fixing nip Nf via the protective layer 304 can be suppressed even further.

As described above, the amplitude of the fixing nip voltage VNf can be reduced effectively according to a simple configuration of connecting the substrate 302 having electric conductivity to the ground potential and setting the impedance of the path passing the insulating layer 303 to be lower than the impedance of the path passing the protective layer 304. Then, the AC voltage component applied from a fixing unit 119 via the recording material 101 to the transfer nip voltage VNt can be suppressed, the AC-induced banding can be suppressed effectively even if the impedance of the recording material 101 is low due to moisture absorption, for example.

The impedance of the path from the heating resistor 301 via the insulating layer 303 to the ground potential includes the impedance of the capacity component of the film 204. Therefore, preferably, the impedance of the path from the heating resistor 301 via the insulating layer 303 to the ground potential is set to be lower than the impedance of the path from the heating resistor 301 via the insulating layer 303 to the inner surface of the film 204. More preferably, as according to the present embodiment, the impedance Zg2 corresponding to the capacity component of the insulating layer 303 is set to be lower than the impedance Zg1 corresponding to the capacity component of the protective layer 304. Thereby, the effect of suppressing the amplitude of the fixing nip voltage VNf can be achieved even more reliably.

Modified Example

According to the present embodiment, the insulating layer 303 and the protective layer 304 are formed of materials having different dielectric constants. However, it is also possible to satisfy the condition of Expression (3) by varying the thicknesses and areas of the insulating layer 303 and the protective layer 304. Specifically, the thickness of the insulating layer 303 can be set smaller than the thickness of the protective layer 304. In another example, the area of the surface of the insulating layer 303 in contact with the substrate 302 can be set smaller than the area of the surface of the protective layer 304, that is, the surface opposed to the inner surface of the film 204.

Fourth Embodiment

The fixing unit according to a fourth embodiment will be described with reference to FIGS. 15 and 16. The present embodiment differs from the third embodiment in that a sliding protective plate 71 is arranged between the heater 202 and the film 204. Hereafter, elements that are assigned with the same reference numbers as the third embodiment are assumed to have substantially the same configuration and function as the third embodiment.

Figure 15:
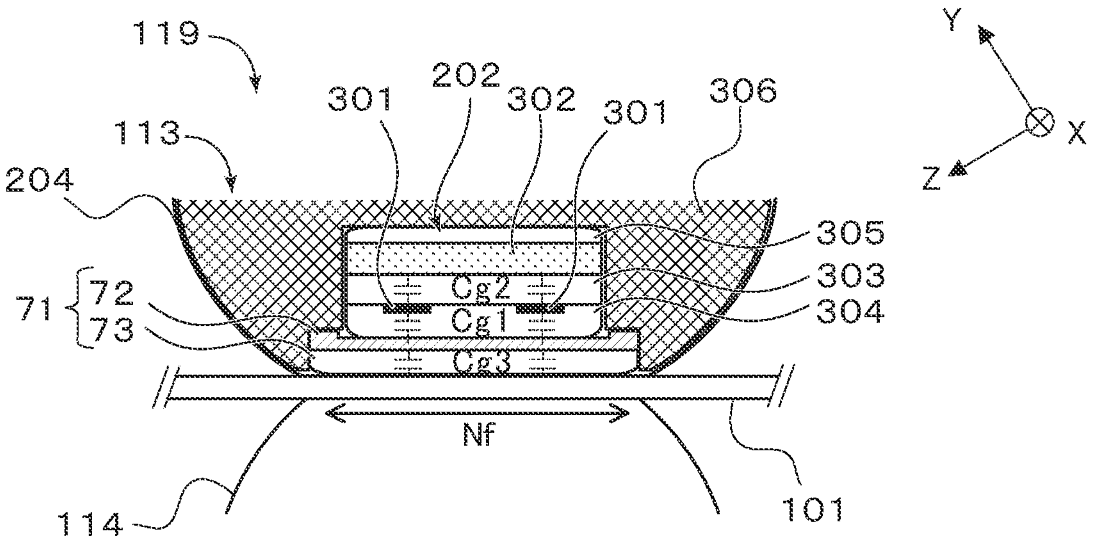
FIG. 15 is a cross-sectional view of a fixing unit according to a fourth embodiment.

FIG. 15 illustrates a cross-sectional view of the heater 202 and the heating device 113, that is, a view in which a cross-section perpendicular to the longitudinal direction of the heater 202 is viewed in the longitudinal direction, according to the present embodiment. As illustrated in FIG. 15, according to the present embodiment, the sliding protective plate 71 serving as a sliding member having an impedance component is arranged between the heater 202 and the film 204 that rotates with the inner surface opposing the heater 202.

The sliding protective plate 71 includes a substrate 72 in the form of an elongated thin plate mainly composed of metal or alloy, and a sliding protective layer 73 that protects the film 204 moved in sliding motion. Material used for forming the substrate 72 can be arbitrarily selected, for example, from stainless steel, nickel, copper, aluminum, and an alloy mainly composed of these metals. The material of the sliding protective layer 73 is not specifically limited, but a material having heat resistance is selected in consideration of the temperature during actual application. For example, a glass or a PI (polyimide) material is preferable from the viewpoint of heat resistance.

The heating resistor 301 of the heater 202 and the substrate 72 of the sliding protective plate 71 are capacitively coupled via the protective layer 304. Further, the substrate 72 of the sliding protective plate 71 and the film 204 are capacitively coupled via the sliding protective layer 73. Cg1 denotes a capacity component of the protective layer 304, that is, a capacity component between the heating resistor 301 and the film 204 that are capacitively coupled via the protective layer 304. Cg3 denotes a capacity component of the sliding protective layer 73, that is, a capacity component between the heating resistor 301 and the film 204 that are capacitively coupled via the sliding protective layer 73.

Figure 16:
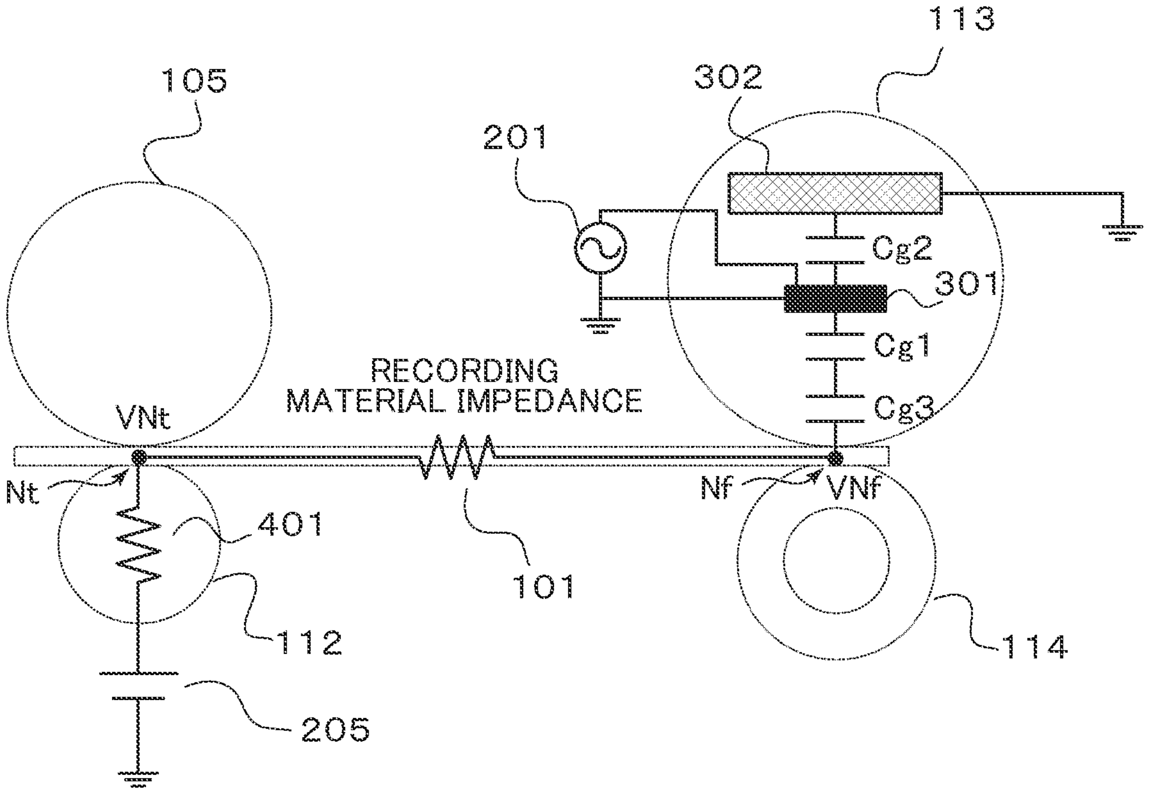
FIG. 16 is a view illustrating an equivalent circuit of an image forming apparatus according to the fourth embodiment.

An equivalent circuit according to the present embodiment is illustrated in FIG. 16. If the impedance of capacity Cg3 of the sliding protective layer 73 is denoted as Zg3, the impedance Zg3 is represented by a following Expression (4).

Expression (4)

$$Zg3 = j\frac{1}{2\pi f(Cg3)} \tag{4}$$

Further, a combined impedance Z1 of the impedance Zg1 of the capacity Cg1 of the protective layer 304 and the impedance Zg3 of the sliding protective layer 73 is represented by a following Expression (5).

Expression (5)

$$Z1 = \sqrt{(Zg1 + Zg3)^2} = \sqrt{\left(\frac{1}{2\pi f(Cg1)} + \frac{1}{2\pi f(Cg3)}\right)^2} \tag{5}$$

In the present embodiment, the substrate 302 is connected to the ground potential, and the relationship between the combined impedance Z1 represented by the above Expression (5) and the impedance Zg2 represented by the Expression (2) satisfy a following inequality (6). In other words, the impedance Zg2 of the insulating layer 303 is set to be lower than the combined impedance Z1 of the protective layer 304 and the sliding protective plate 71.

Expression (6)

$$|Z1| > |Zg2| \tag{6}$$

As an actual example, it is assumed that the power line frequency f of the commercial power supply is 50 Hz, the capacity Cg1 of the protective layer 304 is 800 pF, and the capacity Cg2 of the insulating layer 303 is 600 pF. In this case, based on Expressions (1) and (2), the magnitude of the impedance Zg1 will be 4.0 MΩ, and the magnitude of the impedance Zg2 will be 5.3 MΩ.

In order to satisfy inequality (6), according to the present embodiment, the capacity Cg3 of the sliding protective layer 73 is set to be 800 pF in the example above. In this case, based on Expression (5), the magnitude of the combined impedance Z1 will be 8.0 MΩ, which is greater than the impedance Zg2 of the insulating layer 303.

As described, a configuration where the impedance of the path from the heating resistor 301 via the insulating layer 303 to the ground potential is lower than the impedance of the path from the heating resistor 301 via the protective layer 304 to the fixing nip Nf is adopted according to the present embodiment, similar to the third embodiment. Thereby, the amplitude of the fixing nip voltage VNf applied to the fixing nip Nf via the protective layer 304 can be reduced effectively, and the occurrence of AC-induced banding can be suppressed by a simple configuration.

According further to the present embodiment adopting the sliding protective plate 71, improvement of durability of the fixing unit 119 can be expected compared to the third embodiment in which the film 204 directly slides against the heater 202. Further, since the film 204 is heated through the sliding protective plate 71, the heat uniformity in the longitudinal direction can be improved.

It is also possible to adopt a configuration where the impedance of the path from the heating resistor 301 via the insulating layer 303 to the ground potential is set lower than the impedance between the heating resistor 301 and the inner surface of the film 204 in the fixing nip Nf which are capacitively coupled via the insulating layer 303 and the sliding protective plate 71.

Fifth Embodiment

A fifth embodiment will be described. The present embodiment differs from the third embodiment in that a substrate of a heater is connected to a ground potential via a capacitive impedance. Hereafter, it is assumed that elements assigned with the same reference numbers as the third embodiment adopt substantially the same configurations and functions as the third embodiment.

Figure 17:
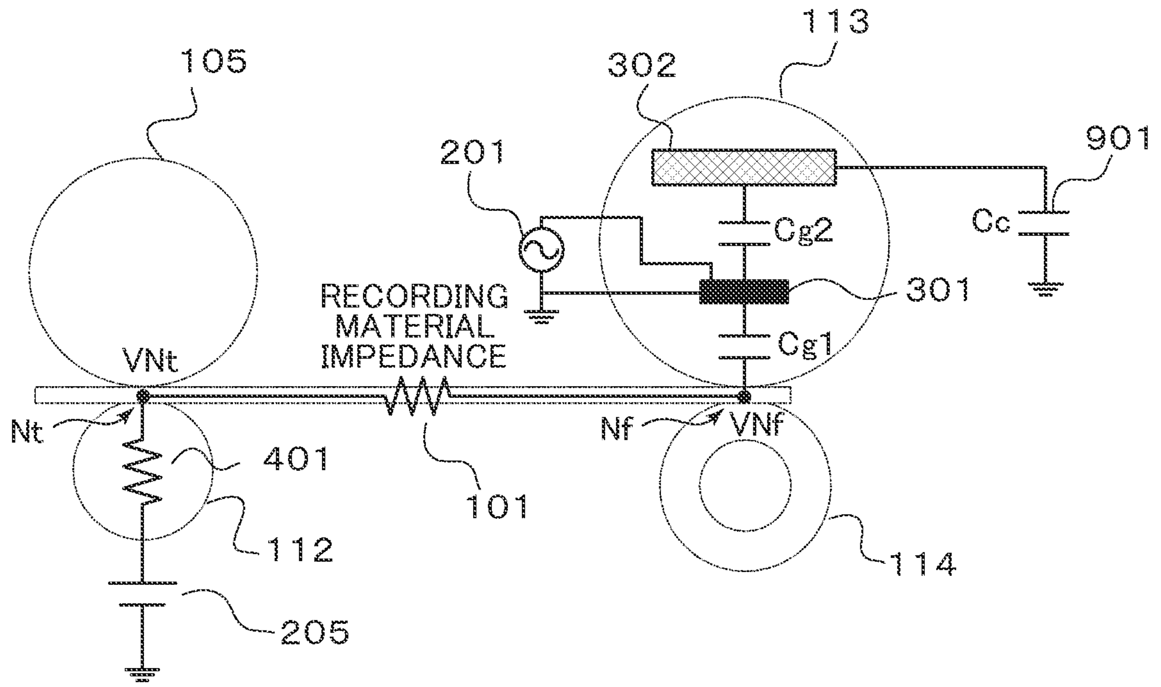
FIG. 17 is a view illustrating an equivalent circuit of an image forming apparatus according to a fifth embodiment.

An equivalent circuit according to the embodiment will be illustrated in FIG. 17. As illustrated in FIG. 17, according to the present embodiment, a capacitor 901 serving as a circuit element having a capacitive impedance is inserted between the substrate 302 of the heater 202 and the ground potential. The capacity component of the capacitor 901 is referred to as Cc. If the impedance of the capacitor 901 is referred to as Zc, the impedance Zc will be expressed by a following Expression (7).

Expression (7)

$$Zc = j\frac{1}{2\pi f(Cc)} \tag{7}$$

Further, a combined impedance Z2 of the impedance Zc of the capacitor 901 and the impedance Zg2 of the capacity Cg2 of the insulating layer 303 will be expressed by a following Expression (8).

Expression (8)

$$Z2 = \sqrt{(Zc + Zg2)^2} = \sqrt{\left(\frac{1}{2\pi f(Cc)} + \frac{1}{2\pi f(Cg2)}\right)^2} \tag{8}$$

In the present embodiment, the relationship between the combined impedance Z2 expressed by the Expression (8) and the impedance Zg1 of the capacity Cg1 of the protective layer 304 is set to satisfy a following inequality (9).

Expression (9)

$$|Zg1| > |Z2| \tag{9}$$

As an actual example, the power line frequency f of the commercial power supply is 50 Hz, the capacity Cg1 of the protective layer 304 is set to 400 pF, and the capacity Cg2 of the insulating layer 303 is set to 1200 pF. In this case, based on Expressions (1) and (2), the magnitude of the impedance Zg1 will be 8.0 MΩ and the magnitude of the impedance Zg2 will be 2.7 MΩ. For example, by selecting the capacitor 901 having a capacity of 1200 pF, based on Expression (8), the combined impedance Z2 will be 5.3 MΩ, and the relationship of Expression (9) is satisfied. The above-mentioned configuration can be restated that the capacity component (Cg1) between the substrate 302 and the heating resistor 301 that are capacitively coupled via the insulating layer 303 serving as a second insulating layer is greater than the capacity component (Cg2) between the heating resistor 301 and the fixing nip Nf that are capacitively coupled via the protective layer 304 serving as a first insulating layer.

As described, a configuration where the impedance of the path from the heating resistor 301 via the insulating layer 303 to the ground potential is lower than the impedance of the path from the heating resistor 301 via the protective layer 304 to the fixing nip Nf is adopted according to the present embodiment, similar to the third embodiment. Thereby, the amplitude of the fixing nip voltage VNf applied to the fixing nip Nf via the protective layer 304 can be reduced effectively, and the occurrence of AC-induced banding can be suppressed by a simple configuration.

Further, since the capacitor 901 which is a capacitive impedance has a frequency characteristic as illustrated in Expression (7), for example, it can be set to have a high impedance with respect to the DC voltage of the transfer power supply 205 and a low impedance with respect to the commercial power supply 201. Accordingly, AC-induced banding can be suppressed effectively by selecting an appropriate capacitor 901 according to the assumed power line frequency of the commercial power supply.

Modified Example

Even if another circuit element, such as a resistance element, is interposed between the substrate 302 and the ground potential, an effect similar to the present embodiment can still be expected if the relationship of Expression (9) is satisfied. Further, even if the sliding protective plate 71 of the fourth embodiment is combined with the capacitor 901 of the present embodiment, an effect similar to the fourth and fifth embodiments can be expected as long as the combined impedance Z2 is set to be lower than the combined impedance Z1 ($|Z1|>|Z2|$).

Further, it is also possible to adopt a configuration where the impedance of the path from the heating resistor 301 via the insulating layer 303 and the capacitor 901 to the ground potential is set to be lower than the impedance between the heating resistor 301 and the inner surface of the film 204 in the fixing nip Nf which are capacitively coupled via the insulating layer 303.

Sixth Embodiment

A fixing unit according to a sixth embodiment will be described with reference to FIGS. 18 to 27. Elements that are assigned with the same reference numbers as the first embodiment are assumed to have substantially the same configurations and functions as the first embodiment, unless denoted otherwise.

Fixing Unit

Figure 18:
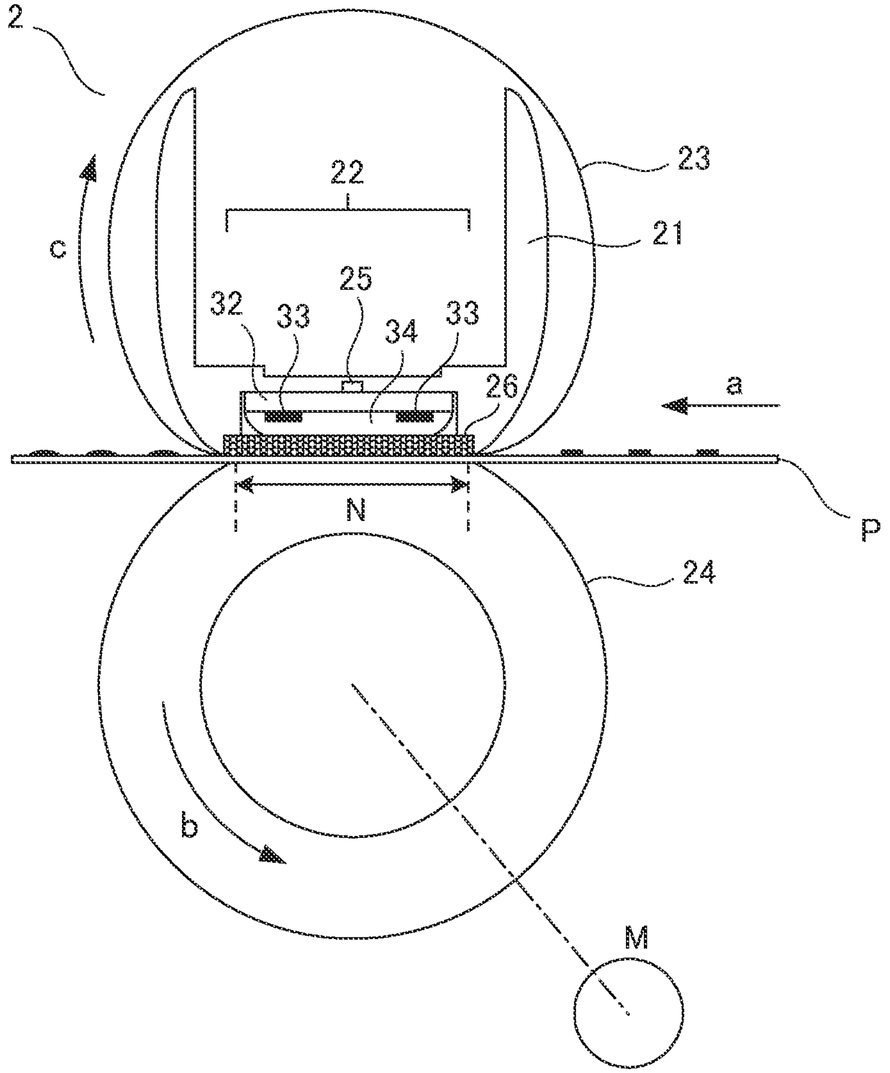
FIG. 18 is a view illustrating a configuration of a fixing unit according to a sixth embodiment.

A configuration of a fixing unit 2 according to the present embodiment will be described with reference to FIG. 18. In the present embodiment, the fixing unit 2 is an image heating device adopting a film heating system that heats a toner image on a recording material via a tubular film. The fixing unit 2 includes a tubular film 23, a conductive plate 26 serving as a sliding member that is in contact with an inner surface of the film 23, a heater 22 that is in contact with the conductive plate 26, and a holding member 21 for holding the heater 22. Further, the fixing unit 2 includes a pressure roller 24 serving as a pressing member that is in pressure contact with the conductive plate 26 across the film 23 and forming a fixing nip N with the conductive plate 26. FIG. 18 is a view illustrating a cross-section of the fixing unit 2 cut along a virtual plane perpendicular to the longitudinal direction that is viewed in the longitudinal direction.

The heater 22 and the conductive plate 26 are arranged inside the tubular film 23, and the toner image on the recording material 101 is heated via the film 23 rotating in the circumferential direction by the conductive plate 26 heated by the heater 22. Aluminum is suitably used as the material of the conductive plate 26 from the viewpoint of thermal conductivity, processability and availability. Further, the film 23 is formed of a material that is mainly formed of polyimide having flexibility and that has a high heat conduction filler composed of conductive carbon added thereto to improve the heat conductivity of and provide electric conductivity to the material. The film 23 rotates while sliding against the conductive plate 26 at the inner surface, that is, inner circumferential surface, thereof.

The heater 22 and the conductive plate 26 are fit to a groove formed on a lower surface, that is, surface facing the pressure roller 24, of the holding member 21, and thereby held, or supported, by the holding member 21. The groove is formed so that the longitudinal direction of the heater 22 and the conductive plate 26 fit thereto corresponds to a direction orthogonal to the conveyance direction of the recording material 101. The holding member 21 also has a function of a guide for guiding the rotation of the film 23. The heater 22 and the conductive plate 26 are bonded by a silicone-based adhesive having a high thermal conductivity so that it has an advantageous thermal conductivity.

A thermistor 25 serving as a temperature detecting element is attached to a surface of the heater 22 opposite from a surface facing the inner surface of the film 23, that is, lower surface of FIG. 18, and electric power supply to a heating resistor 33 is controlled according to a temperature detected by the thermistor 25. Further, the pressure roller 24 rotates in an arrow (b) direction by receiving power from a motor M. By rotation of the pressure roller 24, the film 23 is driven to rotate in an arrow (c) direction. By having the recording material 101 conveyed in an arrow (a) direction at the fixing nip N, the toner image on the recording material is heated, pressed and fixed to the recording material 101.

Heater

Figure 19:
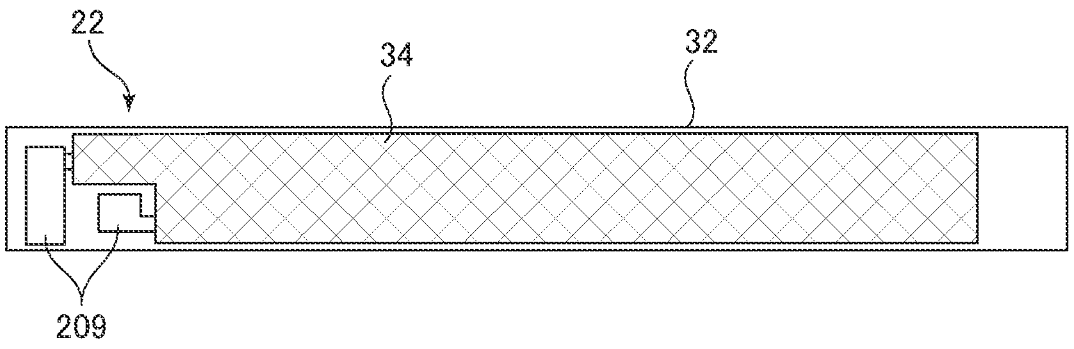
FIG. 19 is a view illustrating a configuration of a heater according to the sixth embodiment.

The heater 22 will be described with reference to FIG. 19. The heater 22 includes the heating resistor 33 (refer to FIG. 18) serving as a heating element that generates heat by passing electric current therethrough, conductive portions 209 for applying a voltage to the heating resistor 33, and a heater substrate 32 on which the heating resistor 33 ad the conductive portions 209 are formed and which is formed as a long thin plate of a ceramic material such as alumina. The area where the heating resistor 33 is formed on the heater substrate 32 is coated with a glass coating 34 serving as a protective layer for providing basic insulation with respect to a commercial power supply voltage applied to the heating resistor 33. It is also possible to form the heater substrate 32 of a metal material such as stainless steel, provide an insulating layer on the heater substrate 32 and arrange the heating resistor 33 on the insulating layer. The material forming the protective layer having an insulating property is not limited to glass.

Figure 20:
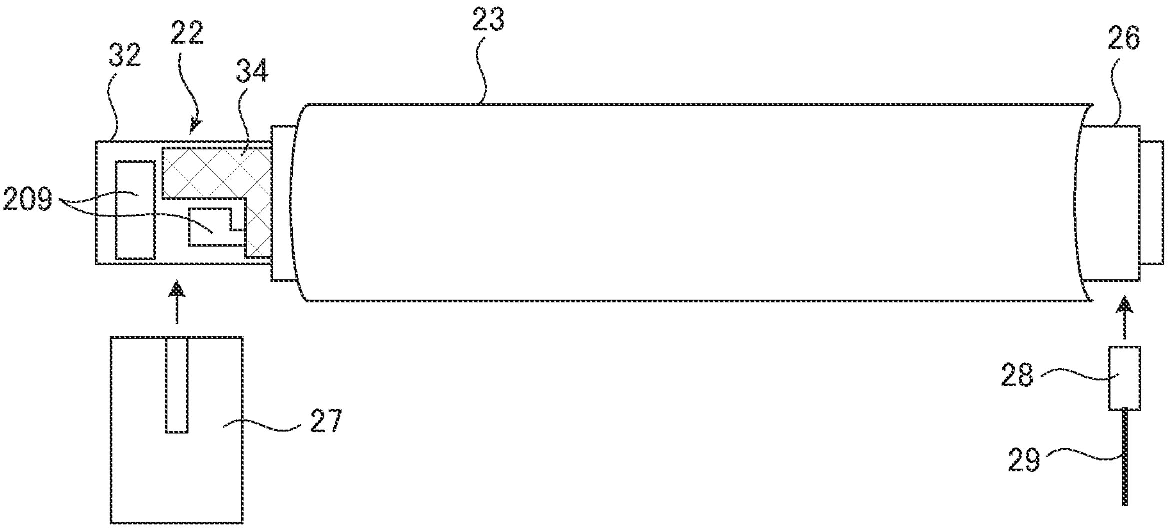
FIG. 20 is a view illustrating a power feeding structure to the fixing unit according to the sixth embodiment.

FIG. 20 illustrates a positional relationship in the longitudinal direction of members viewed from the outer circumference of the film 23 (i.e., viewed in a direction perpendicular to the longitudinal direction from a position outside the film 23) in a state where the conductive plate 26 and the film 23 are set to the heater 22, and a method for feeding power to the heater 22 and the conductive plate 26. The conductive plate 26 and the heater 22 are formed longer than the film 23 in the longitudinal direction of the heater 22, and the longitudinal end portions of the conductive plate 26 and the heater 22 are exposed from the film 23 when viewed in the direction perpendicular to the rotational axis of the film 23. Thus, power can be fed to the heater 22 and the conductive plate 26 at an outer side in the longitudinal direction of the area in which the film 23 is rotated by the rotation of the pressure roller 24.

Further, regarding a short direction, that is, direction perpendicular to the longitudinal direction along the principal plane of the heater substrate 32, of the heater 22, the length of the conductive plate 26 is somewhat longer than, in other words, the width thereof is wider than, the heater 22. Thus, the glass coating 34 of the heater 22 is designed so as not to contact the inner surface of the film 23.

A power feed connector 27 is in contact with the conductive portions 209 of the heater 22 with contact pressure and applies AC voltage supplied from a commercial power supply to the heating resistor 33. A heater clip 28 which is a metal plate bent in the shape of a rectangular shape with one side open is attached to the conductive plate 26. The heater clip 28 has a function to nip the conductive plate 26 and the heater substrate 32 to hold the same to the holding member 21 and has another function to feed the AC voltage described later to the conductive plate 26 through a bundle wire 29.

Now, if power is to be fed to the film 23 instead of the conductive plate 26 as a countermeasure against AC-induced banding, since the film 23 is a rotating member, an arrangement of a contact for realizing a stable electrical connection with the film 23 while allowing rotation may be complicated, and the costs may be increased. By adopting the conductive plate 26 and the heater clip 28 as according to the present embodiment, stable power feed to the conductive plate 26 can be realized by a simple configuration.

An insulating ceramic material is used for the heater substrate 32 according to the present embodiment, but if the heater substrate 32 is formed of a conductive material such as stainless steel, it is necessary to consider insulation from the heater substrate 32 when feeding power to the conductive plate 26 so that the power of the AC voltage is fed only to the conductive plate 26. For example, a method such as welding the bundle wire 29 only to the conductive plate 26 without using the heater clip 28 can be adopted.

Advantages of Present Embodiment With Reference to Equivalent Circuit Diagram

Figure 24:
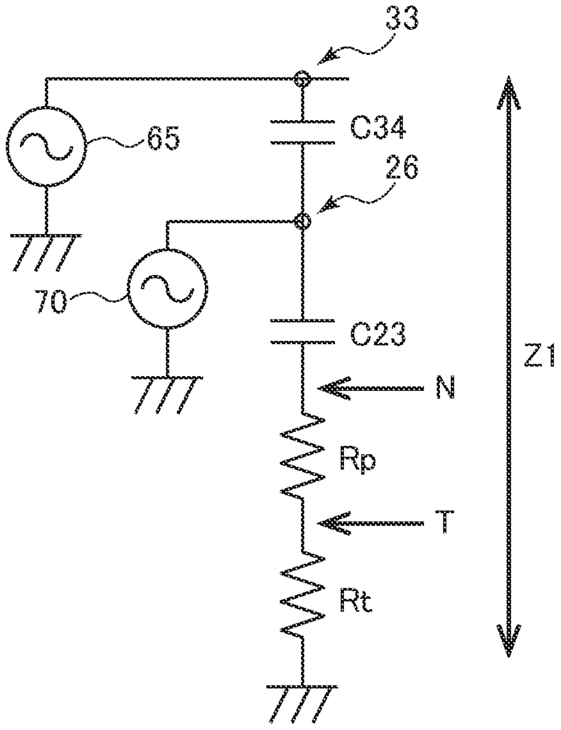
FIG. 24 is an equivalent circuit diagram according to the sixth embodiment is superposed to a transfer voltage.

FIG. 24 is an equivalent circuit diagram in which a current path related to AC-induced banding is illustrated in a state where the present embodiment is adopted. In the drawing, the AC voltage applied from a commercial power supply 65 to the heating resistor 33 and flowing as AC current via the fixing nip N, a resistance component Rp of the recording material 101 and the transfer nip T to a resistance component Rt of a transfer roller 5 causes AC-induced banding.

In FIG. 24, C34 denotes a capacity component of the glass coating 34, and C23 denotes a capacity component of the film 23. A voltage generation circuit 70 for generating AC voltage is a voltage application portion according to the present embodiment for applying AC voltage to the conductive plate 26, as described later, and applies an AC voltage having an inverted phase as the AC voltage of the commercial power supply 65 to the conductive plate 26. According to the present embodiment, the value of C34 is 250 pF, and the value of C23 is 1000 pF. In a high temperature and high humidity environment, Rp will be approximately 120 MΩ and Rt will be approximately 20 MΩ. The magnitude (i.e., absolute value) of the combined impedance Z1 from the heating resistor 33 to the resistance component Rt of the transfer roller 5 is represented by a following Expression (10).

Expression (10)

$$|Z1| = \sqrt{(Rp + Rt)^2 + \left(\frac{1}{2\pi f(C34)} + \frac{1}{2\pi f(C23)}\right)^2} \qquad (10)$$

In the expression, f represents a power line frequency of the commercial power supply, and when f is 50 [Hz], Z1 will be approximately 142 MΩ. If AC voltage is not applied from the voltage generation circuit 70, and assuming that the commercial power supply 65 is 100 Vrms (i.e., 100 V at a root mean square voltage), based on partial pressure calculation of Z1, Rp and Rt, an AC voltage of approximately 98 Vrms is superposed to the fixing nip N and approximately 14 Vrms is superposed to the transfer nip T.

According to the present embodiment, an AC voltage that differs from the commercial power supply 65 is applied to the conductive plate 26 from the voltage generation circuit 70, according to which the amplitude of the synthesized AC voltage waveform is suppressed, and the AC voltage superposed to the transfer nip T can be dropped to below 14 Vrms, according to which AC-induced banding can be suppressed. Since Rp and Rt are varied according to the type, i.e., material and size, of the recording material 101 and temperature and humidity conditions, the occurrence of AC-induced banding can be suppressed stably if the voltage from the voltage generation circuit 70 is applied at a point closer to the commercial power supply 65. At a point of the conductive plate 26, the power supply voltage supplied from the commercial power supply 65 is dropped by a voltage corresponding to C34 which is a capacity component of the glass coating 34. Therefore, since an effect of cancelling the AC voltage with respect to the dropped voltage is achieved according to the voltage generation circuit 70, the AC voltage can be suppressed efficiently.

Figure 25:
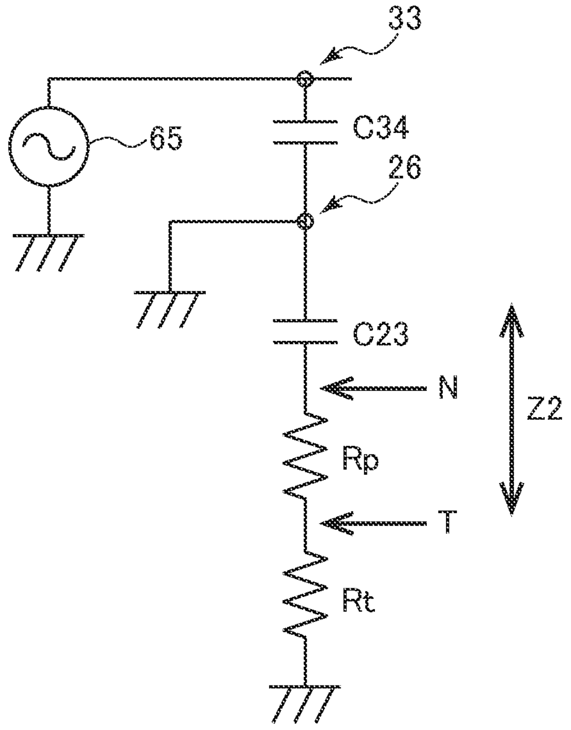
FIG. 25 is an equivalent circuit diagram according to a comparative example.

Now, a problem of a configuration of a comparative example not having the voltage generation circuit 70 will be described with reference to FIG. 25. The configuration of the comparative example is similar to the sixth embodiment except for the conductive plate 26 being directly grounded, or grounded via a low resistance. By simply having the conductive plate 26 grounded, the AC voltage of the commercial power supply 65 is cancelled by the charge supplied from the ground potential, and the AC waveform component transmitted to the fixing nip N and the transfer nip T becomes small. Meanwhile, since the impedance within the film 23 is low, there is a drawback that the transfer voltage Vt tends to drop when the recording material 101 enters the fixing nip N. A similar phenomenon occurs in a case where the inner surface of the film 23 or the surface of the glass coating 34 is grounded, or grounded via a low resistance, without using the conductive plate 26. The magnitude (i.e., absolute value) of the combined impedance Z2 is represented by a following Expression (11).

Expression (11)

$$|Z2| = \sqrt{Rp^2 + \left(\frac{1}{2\pi f(C23)}\right)^2} \tag{11}$$

Similarly as the above example, if Rp is assumed to be 120 MΩ and the film 23 having a thermal conductivity similar to the present embodiment in which a capacity component C23 is 1000 pF is adopted, the impedance of C23 will be so small that it can be ignored, and Z2 will be approximately 120 MΩ. Meanwhile, a transfer power supply 61 carries out constant current control so that a constant current is flown to the transfer nip T during the transfer process. In a case where control is performed by setting a target value of the current flowing to the transfer nip T to 50 μA, a transfer voltage Vt is represented by a following Expression (12) by multiplying 20 MΩ of the resistance component Rt of the transfer roller 5.

Expression (12)

$$Vt=50\ [\mu A]\times 20\ [M\Omega]=1000\ [V] \tag{12}$$

After the recording material 101 enters the fixing nip N, the combined impedance Z2 mentioned above and the resistance component Rt of the transfer roller 5 are apparently connected in parallel with respect to the transfer nip T, and the combined impedance thereof will be represented by the following Expression (13).

Expression (13)

$$Z2/Rt=(Z2\times Rt)/(Z2+Rt)\approx 17\ M\Omega \tag{13}$$

Since constant current control is performed at 50 μA at the transfer nip T, the transfer voltage Vt in this state becomes 850 V based on the following Expression (14).

Expression (14)

$$Vt=50\ [\mu A]\times 17\ [M\Omega]=850\ [V] \tag{14}$$

That is, the voltage value 1000 V of the transfer voltage Vt prior to entering the fixing nip portion is dropped by 150 V and applied, so that transfer failure may occur. Hitherto, the insulating property of the film 23 was enhanced to suppress transfer failure, but instead, it was difficult to enhance the thermal conductivity of the film 23. According to the present embodiment, the film 23 having enhanced thermal conductivity is adopted, and the impedance in the fixing unit is not lowered, so that countermeasures against AC-induced banding is realized without causing the transfer failure described above.

AC Voltage Applied to Conductive Plate

Figure 26:
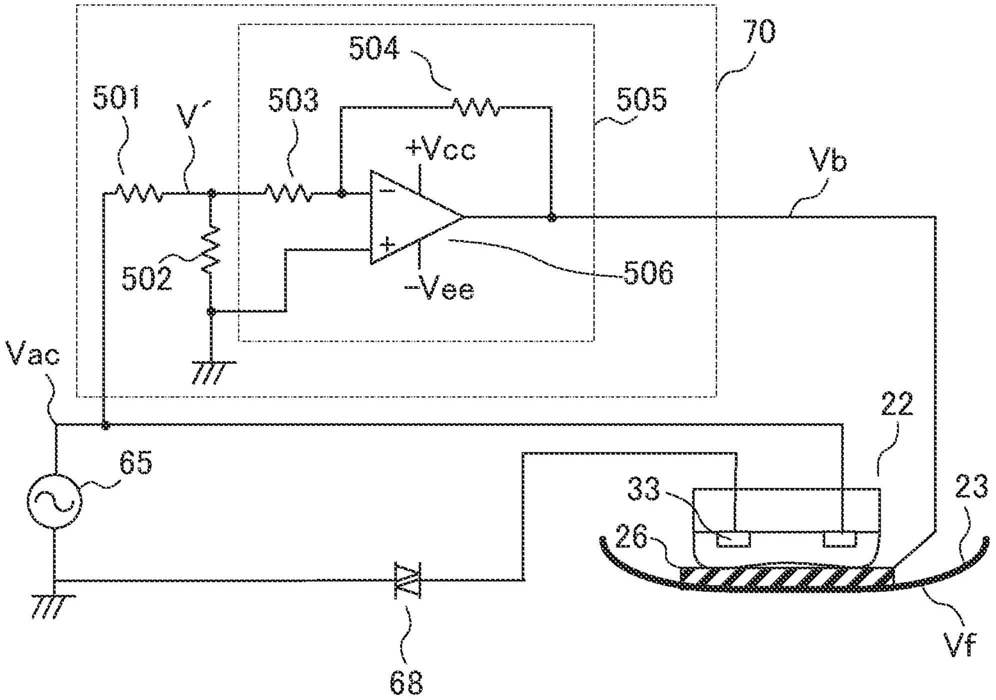
FIG. 26 is a view illustrating a driving circuit for applying voltage to a conductive plate according to the sixth embodiment.

An AC voltage applied to the conductive plate 26 by the voltage generation circuit 70 according to the present embodiment will be described with reference to FIGS. 26 and 27. At first, a resistor 501 capable of realizing a basic insulation against electrification regarding the voltage of the commercial power supply 65 is used. Further, a voltage Vac of the commercial power supply 65 is divided by resistors 501 and 502 to obtain a voltage V' between +Vcc and −Vee and entered to a dual-supply operational amplifier 506. In this case, +Vcc is generated by a diode bridge not shown and −Vee is generated by a DC converter generating a negative output not shown, for example. Next, resistance values of resistors 503 and 504 are equalized, so that a voltage having inverted the phase of V' is output, by which an inverting amplifier 505 of gain −1 is configured. That is, the voltage generation circuit 70 according to the present embodiment refers to a circuit that is driven by the voltage supplied from the commercial power supply 65 and that outputs a voltage Vb of opposite phase (or, inverted phase) and same frequency as the commercial power supply 65. Meanwhile, as for the heating resistor 33, a CPU not shown performs on/off control of a triac 68, by which switching between conduction and interruption of power supply from the commercial power supply 65 to the heating resistor 33 is realized.

Figure 27:
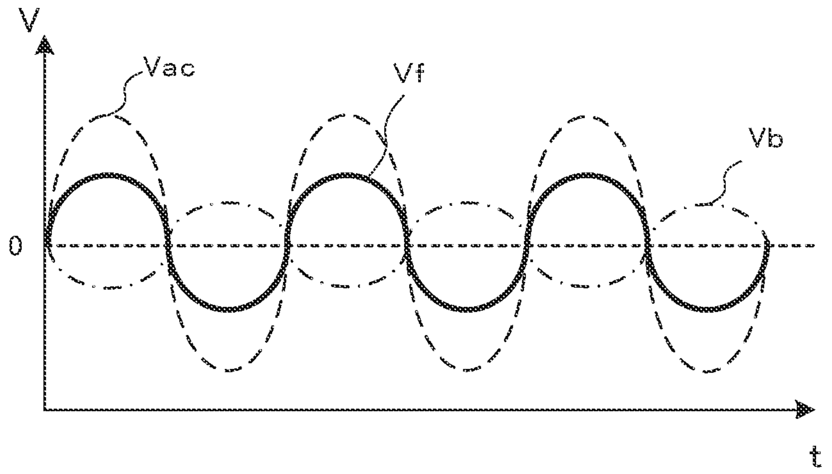
FIG. 27 is a view illustrating a voltage waveform applied to the conductive plate according to the sixth embodiment.

FIG. 27 illustrates waveforms of the voltage Vac of the commercial power supply 65 applied to the heating resistor 33, a voltage Vg of the voltage generation circuit 70 applied to the conductive plate 26, and a voltage Vf generated at an outer surface (i.e., outer circumferential surface) of the film 23. By applying the voltage Vb having an opposite phase (inverted phase) as the commercial power supply 65 via the inverting amplifier 505 to the conductive plate 26, the voltage Vf induced on the outer surface of the film 23 is reduced. That is, it can be recognized that the AC waveform component superposed to the transfer voltage Vt via the recording material 101 becomes small. In other words, it can be recognized that the AC-induced banding can be suppressed effectively according to the configuration of the present embodiment.

According to the present embodiment, the voltage generation circuit 70 including the inverting amplifier 505 adopting the operational amplifier was used as the voltage application portion for applying a voltage having an opposite phase (inverted phase) as the commercial power supply 65 to the conductive plate 26, but other circuit configurations can be adopted to similarly generate a voltage having an opposite phase (inverted phase).

Seventh Embodiment

Figure 28:
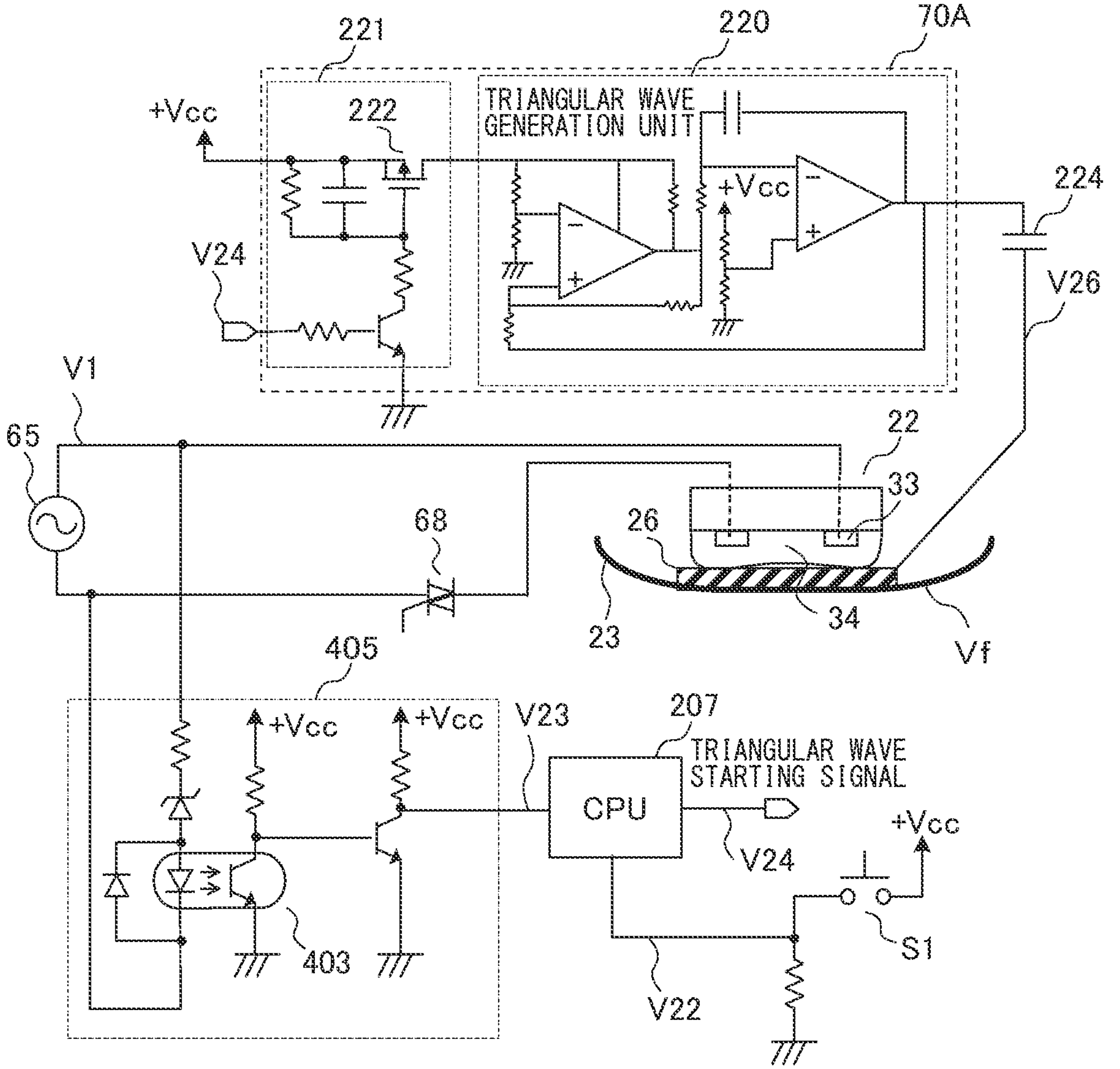
FIG. 28 is a view illustrating a driving circuit for applying voltage to a conductive plate according to a seventh embodiment.
Figure 29A:
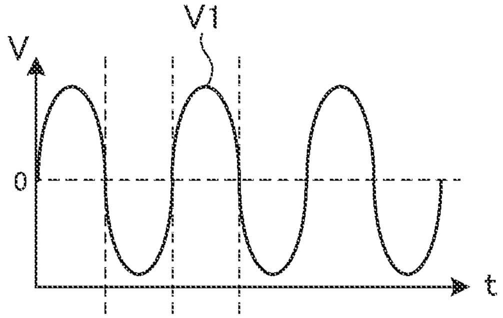
FIG. 29A is a view illustrating a voltage waveform of a commercial power supply according to the seventh embodiment.
Figure 29B:
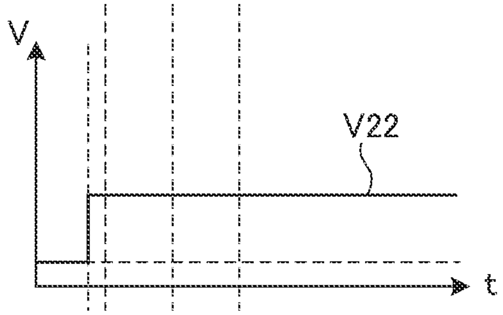
FIG. 29B is a view illustrating a power signal of an image forming apparatus according to the seventh embodiment.
Figure 29C:
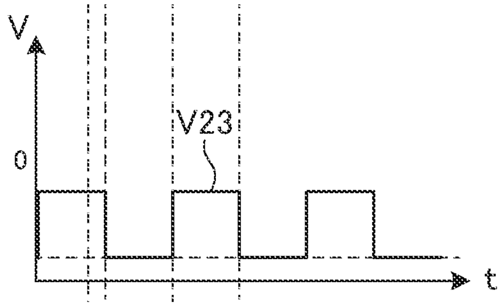
FIG. 29C is a view illustrating a waveform of a zero-crossing signal according to the seventh embodiment.
Figure 29D:
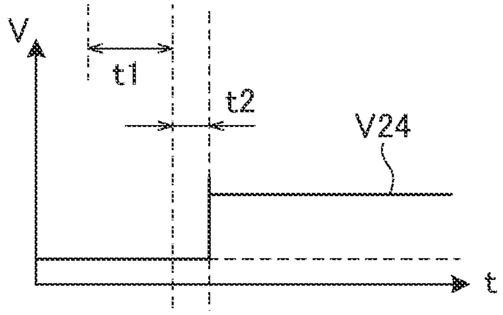
FIG. 29D is a view illustrating a waveform of a triangular wave starting signal according to the seventh embodiment.

A fixing unit according to a seventh embodiment will be described with reference to FIG. 28 and FIGS. 29A to 29C. FIG. 28 is a view illustrating a driving circuit configuration of the heater 22 according to the seventh embodiment. FIGS. 29A to 29E are graphs illustrating a generation process of AC voltage applied to the heater 22 according to the seventh embodiment. FIGS. 30A to 30C are graphs for describing the voltage Vf induced on an outer surface of the film 23 according to the present embodiment. General configuration of the printer 118 according to the seventh embodiment is substantially the same as that of the first embodiment, and general configuration of the fixing unit 2 according to the seventh embodiment is substantially the same as that of the sixth embodiment except for the configuration of a driving circuit of a heater 22, so that similar components are assigned with the same reference numbers as the sixth embodiment, and detailed descriptions thereof are omitted.

The main difference from the sixth embodiment is that the frequency of the voltage applied to the conductive plate 26 is different from the power line frequency of the commercial power supply 65.

The voltage application circuit of the present embodiment is described with reference to FIG. 28 and FIGS. 29A to 29E. A zero-crossing point of AC voltage V1 (FIG. 29A) of the commercial power supply 65 is detected by a zero-cross detection circuit 405, and at the same time, insulation between primary and secondary circuits is realized at a photocoupler 403, and a zero-crossing signal V23 (FIG. 29B) is entered to the CPU 207. Meanwhile, when a power switch 51 of the image forming apparatus is turned on, a power on signal V22 is entered to the CPU 207. The CPU 207 causes a triangular wave starting signal V24 to be raised after elapse of time t1 from the rise of the power on signal V22 (FIG. 29C) to the rise of a subsequent zero-crossing signal V23 and a given time t2 (FIG. 29D). That is, according to the present embodiment, the AC voltage applied to the sliding member is synchronized based on the zero-crossing signal of the AC voltage supplied from the commercial power supply 65.

Figure 29E:
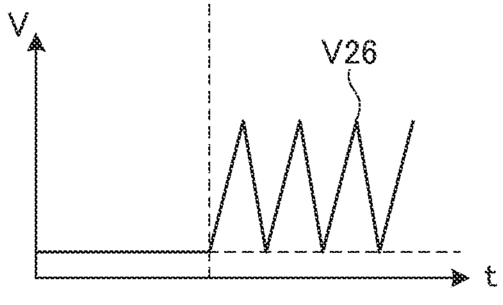
FIG. 29E is a view illustrating a voltage waveform applied to the conductive plate according to the seventh embodiment.
Figures 30A, 30B, 30C:
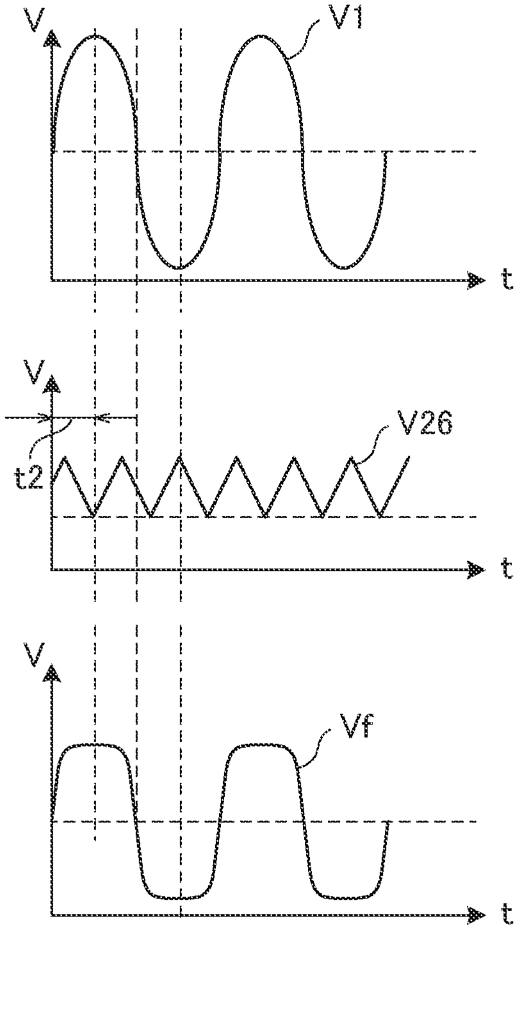
FIG. 30A is a view illustrating a voltage waveform of the commercial power supply according to the seventh embodiment.
FIG. 30B is a view illustrating a voltage waveform applied to the conductive plate according to the seventh embodiment.
FIG. 30C is a view illustrating a voltage waveform induced on an outer surface of a film according to the seventh embodiment.

When the triangular wave starting signal V24 is entered to a triangular wave starting circuit 221 and a load switch 222 is turned on, a power supply voltage +Vcc is entered to a triangular wave generation unit 220, and the triangular wave generation unit 220 generates triangular waves V26 (FIG. 29E). Coupling is performed at a capacitor 224 to generate triangular waves V26 and an additional insulation is ensured, so that insulation of the conductive plate 26 and the circuit is realized. Since the triangular waves V26 are of higher frequency than the power line frequency of the commercial power supply, coupling and insulation can be performed by the capacitor 224 having a small capacity. As described above, the triangular waves V26 are applied to the conductive plate 26 after the elapse of time t2 after the rising of the AC voltage V1 of the commercial power supply 65. A voltage generation circuit 70A composed of the triangular wave starting circuit 221 and the triangular wave generation unit 220 functions as the voltage application portion of the present embodiment.

FIG. 30A illustrates the AC voltage V1 of the commercial power supply 65, FIG. 30B illustrates the triangular waves V26 applied to the conductive plate 26, and FIG. 30C illustrates the voltage Vf induced on the outer surface of the film 23. In the present embodiment, setting is performed at the triangular wave generation unit 220 so that the time t2 is set to correspond to ¼ of the period of the power line frequency the commercial power supply 65 so that the peak voltage of the commercial power supply 65 is suppressed by the triangular waves V26, and that the frequency of the triangular waves V26 is set to triple that of the commercial power supply 65.

As described above, by setting the waves to be superposed (the triangular waves in the present example) to have a frequency that is an odd-number multiplication of the reference frequency (power line frequency of the commercial power supply in the present example), and by adjusting the time t2, a maximum amplitude (i.e., peak-to-peak value) of the AC waveform component (Vf) which is a synthetic wave is suppressed. In other words, the frequency and the phase of V26 is set so that the AC voltage (V26) applied to a substrate 22*a* has a voltage value of opposite polarity as V1 at respective points of time when the AC voltage V1 supplied from the commercial power supply 65 reaches a peak value. Thereby, the AC-induced banding is less likely to occur.

The present embodiment has advantageous safety since the circuit from a phototransistor-side of the photocoupler 403 to an output side of the triangular wave generation unit 220 is a secondary circuit. Further according to the present embodiment, voltage to be applied to the conductive plate 26 is generated without using an additional power supply other than the commercial power supply 65, so that countermeasures against AC-induced banding can be realized by a simple configuration.

According to the present embodiment, triangular waves that can be generated relatively easily are adopted as the AC voltage, and the frequency of the triangular wave is set to three time the power line frequency of the commercial power supply, but other waveforms and frequencies can be adopted. Further, the waveform of the AC voltage superposed to the substrate 22*a* of the heater 22 can be directly generated from the commercial power supply, for example, by a converter circuit and an inverter circuit.

According to the sixth and seventh embodiments described above, a voltage having a different AC component as the commercial power supply 65 applied to the heating resistor 33 is applied to the conductive plate 26. Thereby, the AC waveform component (Vf) caused by the AC voltage applied to the heater 22 of the fixing unit 2 and superposed via the recording material 101 to the transfer voltage Vt can be reduced, so that the occurrence of AC-induced banding can be suppressed.

The sixth and seventh embodiments have illustrated the conductive plate 26 in the form of a plate as an example of the sliding member having electric conductivity, but it can also be a sheet-shaped member, such as a sheet member formed of iron alloy or aluminum, which is thinner and has flexibility. The sixth and seventh embodiments have adopted a simple configuration where the heater 22 is connected to the commercial power supply 65, but the present technique can also be applied to a configuration where the heater 22 generates heat by receiving power supply from an AC power supply that differs from the commercial power supply.

The configurations illustrated in the first to seventh embodiments described above and equivalents thereof enable AC-induced banding to be suppressed by a simple configuration, but the present disclosure does not limit the present technique from being applied in combination with other techniques that have an effect of suppressing AC-induced banding.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2020-112789, filed on Jun. 30, 2020, 2020-112788, filed on Jun. 30, 2020, and 2020-182965, filed on Oct. 30, 2020, which are hereby incorporated by reference herein in their entirety.

What is claimed is:

1. A fixing unit comprising:

a film including a tubular shape and configured to rotate;

a nip forming member arranged inside the film and including a heater configured to generate heat by passing alternating current therethrough; and a pressing member configured to be in pressure contact with the nip forming member across the film, wherein the fixing unit is configured to heat an image on a recording material and fix the image to the recording material while nipping and conveying the recording material by the film and the pressing member at a nip portion between the nip forming member and the pressing member, wherein the heater includes a substrate having electric conductivity, a first insulating layer formed of an insulating material on the substrate, a heating resistor formed on the first insulating layer and configured to generate heat by passing the alternating current therethrough, and a second insulating layer formed of an insulating material to cover the heating resistor, wherein the substrate is electrically connected to a ground potential, wherein an impedance between the heating resistor and the ground potential to which the substrate is connected is lower than an impedance between the heating resistor and the nip portion, and wherein a dielectric constant of the insulating material of the first insulating layer is lower than a dielectric constant of the insulating material of the second insulating layer.

2. The fixing unit according to claim 1, wherein an area of a surface of the first insulating layer in contact with the substrate is greater than an area of a surface of the second insulating layer opposing an inner surface of the film.

3. The fixing unit according to claim 1, wherein the nip forming member further comprises a sliding member arranged between the heater and an inner surface of the film and configured to be in sliding contact with the inner surface of the film, and wherein an impedance of the first insulating layer between the heating resistor and the substrate is lower than an impedance of the second insulating layer and the sliding member between the heating resistor and the nip portion.

4. An image forming apparatus comprising:

an image bearing member configured to rotate;

a transfer member configured to transfer a toner image borne on a surface of the image bearing member to a recording material by having a transfer voltage applied to the transfer member; and the fixing unit according to claim 1 configured to fix the toner image transferred to the recording material by the transfer member to the recording material.

5. The fixing unit according to claim 1, wherein a thickness of the first insulating layer is smaller than a thickness of the second insulating layer.

6. The fixing unit according to claim 1, wherein an impedance of the first insulating layer between the heating resistor and the substrate is lower than an impedance of the second insulating layer between the heating resistor and the nip portion.

7. The fixing unit according to claim 1, further comprising:

a circuit element arranged between the substrate and the ground potential, wherein a combined impedance of the first insulating layer and the circuit element between the heating resistor and the substrate is lower than an impedance of the second insulating layer between the heating resistor and the nip portion.

8. A fixing unit comprising:

a film including a tubular shape and configured to rotate;

a nip forming member arranged inside the film and including a heater configured to generate heat by passing alternating current therethrough; and a pressing member configured to be in pressure contact with the nip forming member across the film, wherein the fixing unit is configured to heat an image on a recording material and fix the image to the recording material while nipping and conveying the recording material by the film and the pressing member at a nip portion between the nip forming member and the pressing member, wherein the heater includes a substrate having electric conductivity, a first insulating layer formed of an insulating material on the substrate, a heating resistor formed on the first insulating layer and configured to generate heat by passing the alternating current therethrough, and a second insulating layer formed of an insulating material to cover the heating resistor, wherein the substrate is electrically connected to a ground potential, wherein an impedance between the heating resistor and the ground potential to which the substrate is connected is lower than an impedance between the heating resistor and the nip portion, and wherein a thickness of the first insulating layer is smaller than a thickness of the second insulating layer.

9. The fixing unit according to claim 8, wherein an impedance of the first insulating layer between the heating resistor and the substrate is lower than an impedance of the second insulating layer between the heating resistor and the nip portion.

10. The fixing unit according to claim 8, further comprising:

a circuit element arranged between the substrate and the ground potential, wherein a combined impedance of the first insulating layer and the circuit element between the heating resistor and the substrate is lower than an impedance of the second insulating layer between the heating resistor and the nip portion.

11. A fixing unit comprising:

a film including a tubular shape and configured to rotate;

a nip forming member arranged inside the film and including a heater configured to generate heat by passing alternating current therethrough; and a pressing member configured to be in pressure contact with the nip forming member across the film, wherein the fixing unit is configured to heat an image on a recording material and fix the image to the recording material while nipping and conveying the recording material by the film and the pressing member at a nip portion between the nip forming member and the pressing member, wherein the heater includes a substrate having electric conductivity, a first insulating layer formed of an insulating material on the substrate, a heating resistor formed on the first insulating layer and configured to generate heat by passing the alternating current therethrough, and a second insulating layer formed of an insulating material to cover the heating resistor, wherein the substrate is electrically connected to a ground potential, wherein an impedance between the heating resistor and the ground potential to which the substrate is connected is lower than an impedance between the heating resistor and the nip portion, and wherein an impedance of the first insulating layer between the heating resistor and the substrate is lower than an impedance of the second insulating layer between the heating resistor and the nip portion.

12. The fixing unit according to claim 11, further comprising:

a circuit element arranged between the substrate and the ground potential, wherein a combined impedance of the first insulating layer and the circuit element between the heating resistor and the substrate is lower than an impedance of the second insulating layer between the heating resistor and the nip portion.

13. A fixing unit comprising:

a film including a tubular shape and configured to rotate;

a nip forming member arranged inside the film and including a heater configured to generate heat by passing alternating current therethrough; and a pressing member configured to be in pressure contact with the nip forming member across the film, wherein the fixing unit is configured to heat an image on a recording material and fix the image to the recording material while nipping and conveying the recording material by the film and the pressing member at a nip portion between the nip forming member and the pressing member, wherein the heater includes a substrate having electric conductivity, a first insulating layer formed of an insulating material on the substrate, a heating resistor formed on the first insulating layer and configured to generate heat by passing the alternating current therethrough, and a second insulating layer formed of an insulating material to cover the heating resistor, wherein the substrate is electrically connected to a ground potential, wherein an impedance between the heating resistor and the ground potential to which the substrate is connected is lower than an impedance between the heating resistor and the nip portion, wherein the fixing unit further comprises a circuit element arranged between the substrate and the ground potential, and wherein a combined impedance of the first insulating layer and the circuit element between the heating resistor and the substrate is lower than an impedance of the second insulating layer between the heating resistor and the nip portion.

* * * * *